US011560494B2

(12) United States Patent
Mori et al.

(10) Patent No.: US 11,560,494 B2
(45) Date of Patent: Jan. 24, 2023

(54) COATING COMPOSITION, SURFACE TREATMENT AGENT CONTAINING SAID COMPOSITION, AND ARTICLE WHICH IS SURFACE-TREATED WITH SAID SURFACE TREATMENT AGENT

(71) Applicant: SHIN-ETSU CHEMICAL CO., LTD., Tokyo (JP)

(72) Inventors: Seiya Mori, Annaka (JP); Ryusuke Sakoh, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 52 days.

(21) Appl. No.: 16/963,615

(22) PCT Filed: Dec. 3, 2018

(86) PCT No.: PCT/JP2018/044393

§ 371 (c)(1),
(2) Date: Jul. 21, 2020

(87) PCT Pub. No.: WO2019/142516

PCT Pub. Date: Jul. 25, 2019

(65) Prior Publication Data

US 2021/0062039 A1 Mar. 4, 2021

(30) Foreign Application Priority Data

Jan. 22, 2018 (JP) ............................. JP2018-008024

(51) Int. Cl.

*C09D 183/14* (2006.01)
*C09D 5/00* (2006.01)
*C09D 183/08* (2006.01)

(52) U.S. Cl.

CPC ............. *C09D 183/14* (2013.01); *C09D 5/00* (2013.01); *C09D 183/08* (2013.01)

(58) Field of Classification Search

None

See application file for complete search history.

(56) References Cited

U.S. PATENT DOCUMENTS

| | | | |
|---|---|---|---|
| 2009/0208728 | A1 | 8/2009 | Itami et al. |
| 2009/0216035 | A1 | 8/2009 | Itami et al. |
| 2012/0077041 | A1 | 3/2012 | Yamane et al. |
| 2013/0136928 | A1 | 5/2013 | Yamane et al. |
| 2013/0303689 | A1 | 11/2013 | Sato et al. |
| 2015/0274889 | A1 | 10/2015 | Sakoh et al. |
| 2015/0307719 | A1 | 10/2015 | Mitsuhashi et al. |

FOREIGN PATENT DOCUMENTS

| | | | |
|---|---|---|---|
| CN | 1337417 | A | 2/2002 |
| JP | 2001-353808 | A | 12/2001 |
| JP | 2004-177737 | A | 6/2004 |
| JP | 2008-534696 | A | 8/2008 |
| JP | 2008-537557 | A | 9/2008 |
| JP | 2012-72272 | A | 4/2012 |
| JP | 2012-157856 | A | 8/2012 |
| JP | 2013-136833 | A | 7/2013 |
| JP | 2014-218639 | A | 11/2014 |
| JP | 2015-199906 | A | 11/2015 |
| JP | 2018-2933 | A | 1/2018 |
| WO | WO 2017/061235 | A1 | 4/2017 |
| WO | WO 2017/212850 | A1 | 12/2017 |

OTHER PUBLICATIONS

WO2017-061235 English Machine Translation (2017).*
RN 2094977-84-9 WO 2017/061235 ACS CAPLUS (2017).*
International Search Report, issued in PCT/JP2018/044393, PCT/ISA/210, dated Mar. 5, 2019.

* cited by examiner

*Primary Examiner* — Kenneth J Stachel

(74) *Attorney, Agent, or Firm* — Birch, Stewart, Kolasch & Birch, LLP

(57) ABSTRACT

According to the present invention, a surface treatment agent which contains a coating composition that contains (A) one or more compounds selected from among organosilane or siloxane compounds represented by formula (1) and partial (hydrolysis) condensation products of the compounds and (B) one or more compounds selected from among silane or siloxane compounds represented by formula (2) and partial (hydrolysis) condensation products of the compounds at a mass ratio of from 50:50 to 90:10 is able to form a cured coating film that has excellently low fingerprint visibility.

(1)

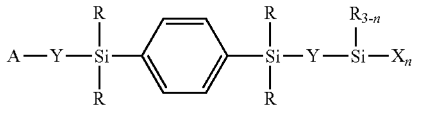

(In formula (1), A represents —C(=O)OR[1], —C(=O)NR[1]$_2$, —C(=O)SR[1] or —P(=O)(OR[1])$_2$; R[1] represents H, an alkyl group, an aryl group or an aralkyl group; Y represents a divalent organic group; R represents an alkyl group or a phenyl group; X represents a hydroxyl group or a hydrolyzable group; and n is 1-3.)

(2)

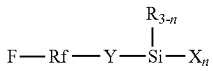

(In formula (2), Rf represents a perfluoroalkylene group or a divalent perfluoropolyether group.)

28 Claims, No Drawings

COATING COMPOSITION, SURFACE TREATMENT AGENT CONTAINING SAID COMPOSITION, AND ARTICLE WHICH IS SURFACE-TREATED WITH SAID SURFACE TREATMENT AGENT

TECHNICAL FIELD

This invention relates to a coating composition having excellent low-fingerprint-visibility, a surface treating agent comprising the composition, and an article which is surface-treated with the surface treating agent.

BACKGROUND ART

Recently, there is an accelerating demand to mount touch panels on mobile phones and other displays. Because of manipulation by touching with the finger, fingerprints and stains deposit on the touch panels, which look dirty or indistinct. There is an annually increasing need for technology to prevent fingerprints from depositing on a display surface or make fingerprints inconspicuous for better appearance or visibility. It is thus desired to have a material capable of meeting these requirements.

In general, silane coupling agents are well known as a surface modifier for glass and fabric substrates. They are widely used as surface coating agents for numerous substrates. The silane coupling agent contains an organic functional group and a reactive silyl group (typically hydrolyzable silyl such as alkoxysilyl) in the molecule. In the presence of airborne moisture or the like, the hydrolyzable silyl groups undergo self-condensation reaction to form a coating. Since the hydrolyzable silyl groups form chemical and physical bonds with the surface of glass or metal, the coating becomes a tough coating having durability.

Patent Documents 1 to 6 (JP-A 2008-534696, JP-A 2008-537557, JP-A 2012-072272, JP-A 2012-157856, JP-A 2013-136833, JP-A 2015-199906) disclose many compositions comprising a fluoropolyether-containing polymer which is obtained by introducing a hydrolyzable silyl group into a fluoropolyether-containing compound, the composition being able to form a coating with water/oil repellency, antifouling and other properties on the substrate surface.

Although the conventional coating layer formed using a fluoropolyether-containing polymer is oil/water repellent and easy to wipe off stains, there is one problem that the coating surface repels the sebum in fingerprints into microscopic droplets, which scatter light, so that the fingerprints look conspicuous.

Also, Patent Document 7 (JP-A 2001-353808) discloses a composition comprising a silane compound obtained by introducing a hydrolyzable silyl group into a lipophilic compound, the composition being tightly adherent to a substrate surface and forming a lipophilic coating thereon.

However, a coating of the silane compound described in Patent Document 7 does not have practically satisfactory low-fingerprint-visibility because it takes several days until fingerprints become substantially inconspicuous.

PRIOR ART DOCUMENTS

Patent Documents

Patent Document 1: JP-A 2008-534696
Patent Document 2: JP-A 2008-537557
Patent Document 3: JP-A 2012-072272
Patent Document 4: JP-A 2012-157856
Patent Document 5: JP-A 2013-136833
Patent Document 6: JP-A 2015-199906
Patent Document 7: JP-A 2001-353808

SUMMARY OF INVENTION

Technical Problem

An object of the invention, which has been made under the above-mentioned circumstances, is to provide a coating composition composed mainly of a silane compound having a hydrolyzable silyl group introduced therein and having excellent low-fingerprint-visibility, a surface treating agent comprising the composition, and an article which is surface-treated with the surface treating agent.

Solution to Problem

Making extensive investigations to attain the above object, the inventors have found that a coating composition comprising (A) one or more compounds selected from among organosilane or siloxane compounds containing a hydroxyl or hydrolyzable group and a lipophilic group, represented by the general formula (1) below and partial (hydrolytic) condensates thereof and (B) one or more compounds selected from among silane or siloxane compounds containing a hydroxyl or hydrolyzable group and a fluorinated organic group, represented by the general formula (2) below and partial (hydrolytic) condensates thereof in a weight ratio (A):(B) of from 50:50 to 90:10 is able to form a cured film having excellent low-fingerprint-visibility. The present invention is predicated on this finding.

Accordingly, the invention provides a coating composition, a surface treating agent, and an article, as defined below.

1.

A coating composition comprising (A) one or more compounds selected from among organosilane or siloxane compounds having the general formula (1) and partial (hydrolytic) condensates thereof and (B) one or more compounds selected from among silane or siloxane compounds having the general formula (2) and partial (hydrolytic) condensates thereof in a weight ratio of from 50:50 to 90:10, the total of components (A) and (B) being 100,

[Chem. 1]

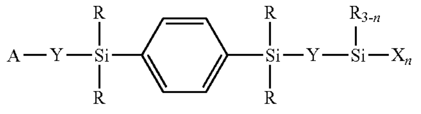

(1)

wherein A is —C(═O)$OR^1$, —C(═O)$NR^1_2$, —C(═O)$SR^1$ or —P(═O)$(OR^1)_2$, $R^1$ is hydrogen, a $C_1$-$C_{30}$ alkyl group, $C_6$-$C_{30}$ aryl group or $C_7$-$C_{30}$ aralkyl group, Y is independently a divalent organic group which may contain an organopolysiloxane residue, R is independently a $C_1$-$C_4$ alkyl group or phenyl group, X is independently a hydroxyl group or hydrolyzable group, and n is an integer of 1 to 3,

[Chem. 2]

(2)

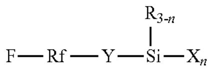

wherein Rf is a perfluoroalkylene group or divalent perfluoropolyether group, Y, R, X and n are as defined above.

2.

The coating composition of 1 wherein in formulae (1) and (2), Y is independently a $C_2$-$C_{30}$ alkylene group which may contain a divalent group selected from among —O—, —S—, —NR—, —C(═O)—, —C(═O)O—, —C(═O)NR—, —OC(═O)NR—, silalkylene group, silarylene group, and straight, branched or cyclic divalent organopolysiloxane residues of 2 to 10 silicon atoms, wherein R is $C_1$-$C_4$ alkyl or phenyl, and which may contain a $C_6$-$C_{20}$ arylene group.

3.

The coating composition of 1 or 2 wherein in formulae (1) and (2), X is independently selected from the group consisting of hydroxyl, $C_1$-$C_{10}$ alkoxy, $C_2$-$C_{10}$ alkoxy-substituted alkoxy, $C_1$-$C_{10}$ acyloxy, $C_2$-$C_{10}$ alkenyloxy, halogen, oxime, isocyanate, and cyanate.

4.

The coating composition of any one of 1 to 3 wherein in formula (2), Rf is a $C_3$-$C_{12}$ perfluoroalkylene group or a divalent perfluoropolyether group having the formula (3):

[Chem. 3]

$$—(J—O)_b—J— \quad (3)$$

wherein J is at least one group selected from perfluoroalkylene groups having the structural formulae (a) to (e):

[Chem. 4]

(a)

$—CF_2—$ (b)

$—CF_2CF_2—$ (c)

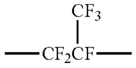

(d)

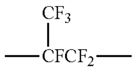

(e)

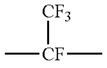

and all J may have the same structure or plural structures may be arrayed randomly or blockwise, and b indicative of the number of repeating units is from 3 to 6.

5.

A surface treating agent comprising the coating composition of any one of 1 to 4.

6.

The surface treating agent of 5, further comprising a solvent.

7.

The surface treating agent of 5 or 6, further comprising a hydrolytic condensation catalyst.

8.

The surface treating agent of any one of 5 to 7, which cures into a film having a contact angle with oleic acid of up to 30° at 25° C. and relative humidity 40%.

9.

The surface treating agent of any one of 5 to 8, which cures into a film having a haze of up to 10 when sebum is deposited to the cured film under a load of 1 kg.

10.

An article having on its surface a cured film of the surface treating agent of any one of 5 to 9.

ADVANTAGEOUS EFFECTS OF INVENTION

The coating composition of the invention consists of a mixture of a lipophilic molecule and an oil repellent molecule in a good balance and has the advantage that few fingerprints are put on a coating, and if any fingerprints are put on a coating, the coating wets and spreads the sebum in the fingerprints over the substrate. An article which has been surface-treated with a surface treating agent comprising the coating composition has excellent low-fingerprint-visibility.

DESCRIPTION OF EMBODIMENTS

The invention provides a coating composition comprising one or more compounds selected from among organosilane or siloxane compounds containing a hydroxyl or hydrolyzable group and a lipophilic group and partial (hydrolytic) condensates thereof, referred to as component (A), hereinafter, and one or more compounds selected from among organosilane or siloxane compounds containing a hydroxyl or hydrolyzable group and a fluorinated organic group (specifically perfluoroalkyl group or monovalent perfluoropolyether group) and partial (hydrolytic) condensates thereof, referred to as component (B), hereinafter, in a weight ratio (A):(B) of from 50:50 to 90:10.

Component (A) is selected from among organosilane or siloxane compounds having the general formula (1) below and partial (hydrolytic) condensates thereof. It may be one compound or a mixture of two or more compounds.

[Chem. 5]

(1)

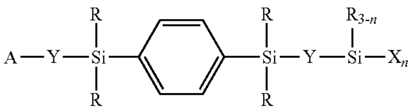

Herein "A" is —C(═O)OR$^1$, —C(═O)NR$^1_2$, —C(═O)SR$^1$, or —P(═O)(OR$^1$)$_2$, $R^1$ is hydrogen, a $C_1$-$C_{30}$ alkyl group, $C_6$-$C_{30}$ aryl group or $C_7$-$C_{30}$ aralkyl group, Y is independently a divalent organic group which may contain an organopolysiloxane residue, R is independently a $C_1$-$C_4$ alkyl group or phenyl group, X is independently a hydroxyl group or hydrolyzable group, and n is an integer of 1 to 3.

In formula (1), "A" is a carboxylate or carboxylic acid of the formula: —C(═O)OR$^1$, amide of the formula: —C(═O)NR$^1_2$, thio-ester or thio-acid of the formula: —C(═O)SR$^1$, or phosphonate or phosphonic acid of the formula: —P(═O)(OR$^1$)$_2$.

Herein, $R^1$ is hydrogen, a $C_1$-$C_{30}$ alkyl group, $C_6$-$C_{30}$ aryl group or $C_7$-$C_{30}$ aralkyl group. The alkyl group may be straight, branched or cyclic, or a combination thereof.

Examples of $R^1$ include hydrogen, alkyl groups such as methyl, ethyl, propyl, butyl, pentyl, hexyl, heptyl, octyl, nonyl, decyl, dodecyl, tetradecyl, hexadecyl, octadecyl, isopropyl, isobutyl, tert-butyl, neopentyl, thexyl, cyclopentyl, cyclohexyl, cycloheptyl, cyclohexylmethyl, norbornyl, decahydronaphthyl, adamantyl, and adamantylmethyl; aryl groups such as phenyl, tolyl, and naphthyl; and aralkyl groups such as benzyl, phenylethyl, and phenylpropyl. $R^1$ is preferably methyl, ethyl, butyl, cyclohexylmethyl or benzyl.

Examples of "A" are shown below.

[Chem. 6]

$CH_3OOC$— $C_2H_5OOC$— $C_4H_9OOC$— $C_8H_{17}OOC$—

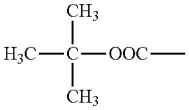

$(C_2H_5)_2NOC$— $C_8H_{17}SOC$—

$(CH_3O)_2POC$— $(C_2H_5O)_2POC$—

[Chem. 7]

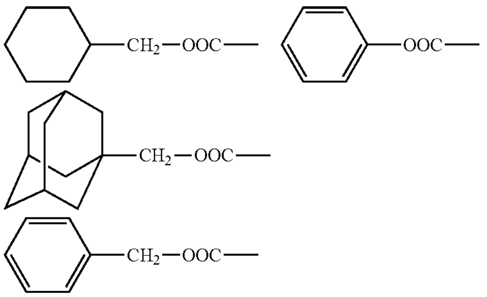

In formula (1), X which may be different from each other is a hydroxyl or hydrolyzable group. Examples of X include hydroxyl, $C_1$-$C_{10}$ alkoxy groups such as methoxy, ethoxy, propoxy, isopropoxy, and butoxy, $C_2$-$C_{10}$ alkoxy-substituted alkoxy groups such as methoxymethoxy and methoxyethoxy, $C_1$-$C_{10}$ acyloxy groups such as acetoxy, $C_2$-$C_{10}$ alkenyloxy groups such as isopropenoxy, halogen atoms such as fluorine, chlorine, bromine and iodine, oxime, isocyanate, and cyanate. Inter alia, methoxy, ethoxy, isopropenoxy and chlorine are preferred.

In formula (1), R is a $C_1$-$C_4$ alkyl group such as methyl, ethyl, propyl, isopropyl, butyl, isobutyl, sec-butyl, or tert-butyl, or phenyl, with methyl being preferred. The subscript n is an integer of 1 to 3, preferably 2 or 3, most preferably 3 as viewed from reactivity and substrate adhesion.

In formula (1), Y is a divalent organic group which may contain an organopolysiloxane residue. Preferably Y is a $C_2$-$C_{30}$, especially $C_2$-$C_{20}$ alkylene group which may contain a divalent group selected from the group consisting of —O—, —S—, —NR—, —C(═O)—, —C(═O)O—, —C(═O)NR—, —OC(═O)NR—, silalkylene group, silarylene group, and straight, branched or cyclic divalent organopolysiloxane residues of 2 to 10 silicon atoms, wherein R is as defined above, and which may contain a $C_6$-$C_{20}$ arylene group. More preferably Y is a divalent group having the formula (4).

$$—R^3—Z—(R^3)_a— \quad (4)$$

In formula (4), $R^3$ is independently a divalent hydrocarbon group. Examples include $C_1$-$C_{30}$ alkylene groups such as methylene, ethylene, propylene, butylene and hexamethylene, and $C_7$-$C_{30}$ alkylene groups containing a $C_6$-$C_{20}$ arylene group such as phenylene, with $C_1$-$C_{20}$ alkylene groups being preferred.

In formula (4), Z is a single bond, or a divalent group selected from the group consisting of —O—, —S—, —NR—, —C(═O)—, —C(═O)O—, —C(═O)NR—, —OC(═O)NR—, silalkylene group, silarylene group, and straight, branched or cyclic divalent organopolysiloxane residues of 2 to 10 silicon atoms, preferably 2 to 5 silicon atoms, wherein R is as defined above.

Examples of the silalkylene and silarylene groups are shown by the following formula.

[Chem. 8]

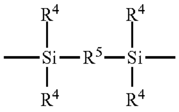

Herein $R^4$ which may be the same or different is a $C_1$-$C_4$ alkyl group such as methyl, ethyl, propyl or butyl, or $C_6$-$C_{10}$ aryl group such as phenyl. $R^5$ is a $C_1$-$C_4$ alkylene group such as methylene, ethylene, or propylene (trimethylene or methylethylene) or $C_6$-$C_{10}$ arylene group such as phenylene.

Examples of the straight, branched or cyclic divalent organopolysiloxane residue of 2 to 10 silicon atoms, preferably 2 to 5 silicon atoms are shown by the following formulae.

[Chem. 9]

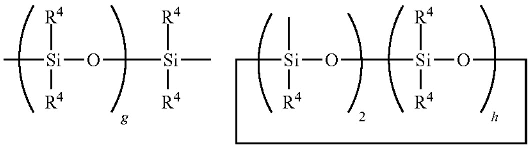

Herein $R^4$ is as defined above, g is an integer of 1 to 9, preferably 1 to 4, and h is an integer of 1 to 8, preferably 1 to 3.

In formula (4), "a" is 0 or 1.

Exemplary of Y are the following groups.

[Chem. 10]

$—CH_2CH_2—$ $—CH_2CH_2CH_2—$ $—CH_2CH_2CH_2CH_2—$ $—CH_2CH_2CH_2CH_2CH_2—$ $—CH_2CH_2CH_2CH_2CH_2CH_2—$ $—CH_2CH_2CH_2CH_2CH_2CH_2CH_2—$ $—CH_2CH_2CH_2CH_2CH_2CH_2CH_2CH_2—$ $—CH_2CH_2CH_2CH_2CH_2CH_2CH_2CH_2CH_2—$ $—CH_2CH_2CH_2CH_2CH_2CH_2CH_2CH_2CH_2CH_2—$ $—CH_2CH_2CH_2CH_2CH_2CH_2CH_2CH_2CH_2CH_2CH_2CH_2—$

-continued
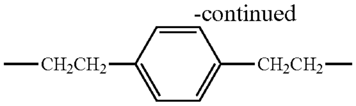
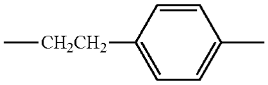
[Chem. 11]
$—CH_2CH_2—O—CH_2CH_2—$
$—(CH_2)_{10}—O—CH_2CH_2—$
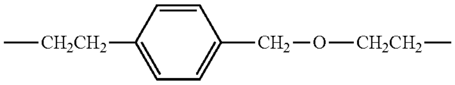
$—CH_2CH_2—S—CH_2CH_2—$
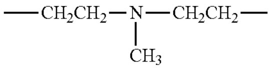
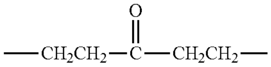
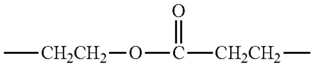
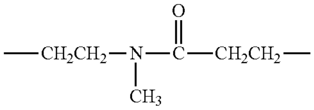
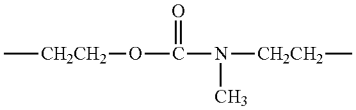
-continued
[Chem. 12]
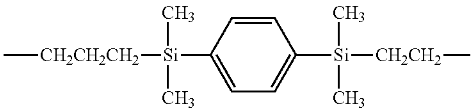
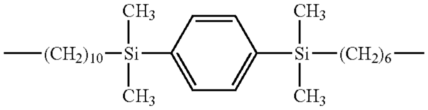
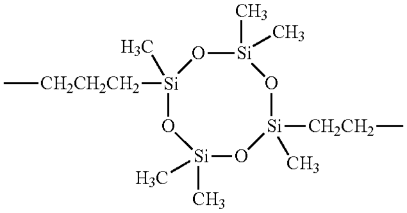
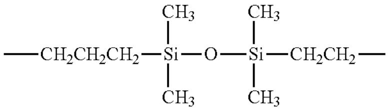
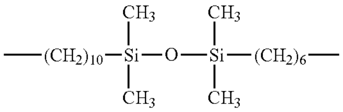
Exemplary of the organosilane or siloxane compound having formula (1) are compounds of the following formulae.
[Chem. 13]
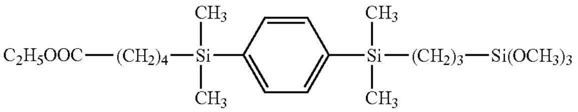
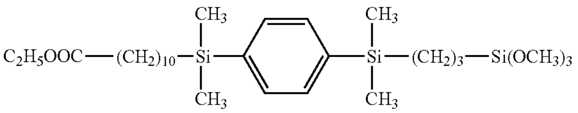
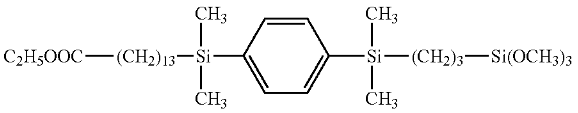
[Chem. 14]
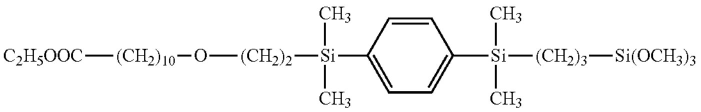
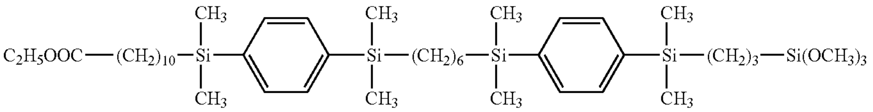
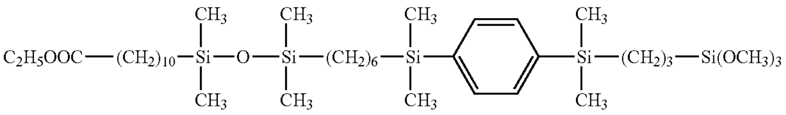

-continued

[Chem. 15]

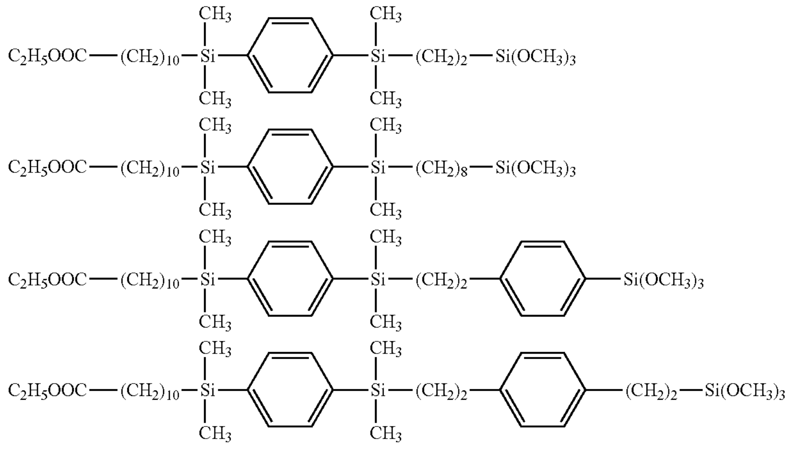

[Chem. 16]

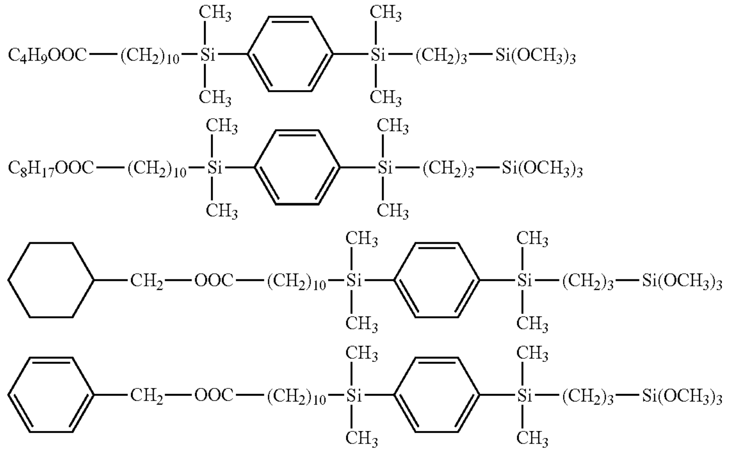

[Chem. 17]

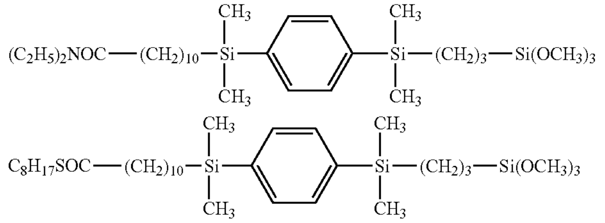

Of the organosilane or siloxane compounds as component (A), lipophilic group-containing organosilane compounds having the general formula (5) are more preferred.

[Chem. 18]

(5)

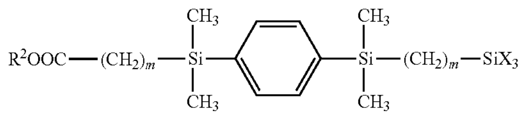

Herein $R^2$ is a $C_1$-$C_{20}$ alkyl group, $C_6$-$C_{20}$ aryl group or $C_7$-$C_{20}$ aralkyl group, m is each independently an integer of 2 to 20, preferably 3 to 10, and X is as defined above.

In formula (2), $R^2$ is a $C_1$-$C_{20}$ alkyl group, $C_6$-$C_{20}$ aryl group or $C_7$-$C_{20}$ aralkyl group. Examples of $R^2$ include alkyl groups such as methyl, ethyl, propyl, butyl, pentyl, hexyl, heptyl, octyl, nonyl, decyl, dodecyl, tetradecyl, hexadecyl, octadecyl, isopropyl, isobutyl, tert-butyl, neopentyl, thexyl, cyclopentyl, cyclohexyl, cycloheptyl, cyclohexylmethyl, norbornyl, decahydronaphthyl, adamantyl, and adamantylmethyl; aryl groups such as phenyl, tolyl, and naphthyl; and aralkyl groups such as benzyl, phenylethyl, and phenylpropyl. $R^2$ is preferably ethyl, octyl, cyclohexylmethyl or benzyl.

Exemplary of the lipophilic group-containing organosilane compound having formula (5) are compounds of the following formulae.

[Chem. 19]

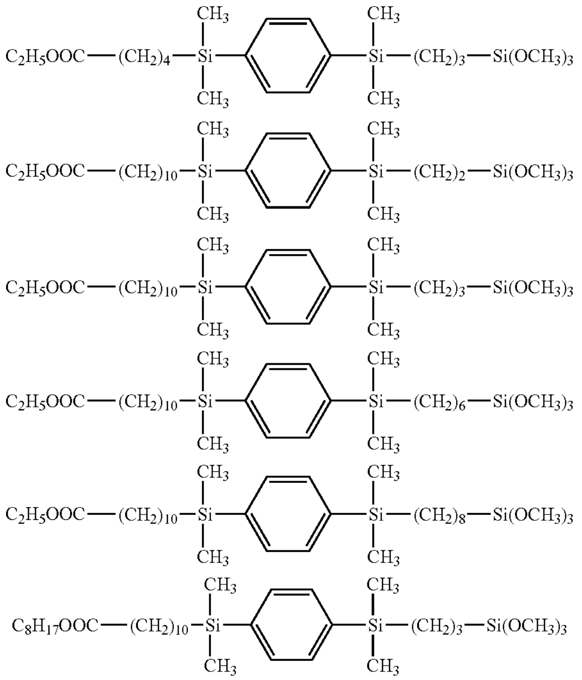

[Chem. 20]

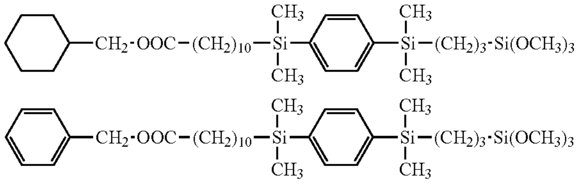

The organosilane or siloxane compound having formula (1) may be prepared by the method of Japanese Patent Application No. 2017-206986. The following method is exemplary of the method for preparing the organosilane compound having formula (1) wherein Y is each independently a $C_2$-$C_{30}$ alkylene group and R is methyl.

A silane compound having "A" in formula (1) and phenyldimethylsilyl site at ends of the molecular chain (for example, dimethylsilane having "A" in formula (1) and dimethylhydrogensilylphenyl as silicon-bonded substituents) is heated and stirred at a temperature of 40 to 120° C., preferably 60 to 100° C., most preferably about 80° C., after which a hydrosilylation catalyst, for example, toluene solution of chloroplatinic acid/vinylsiloxane complex is added. Subsequently, a compound having a hydrolyzable silyl group and an olefin site (e.g., alkenyl group) at ends of the molecular chain is added dropwise. The reaction mixture is then aged at a temperature of 40 to 120° C., preferably 60 to 100° C., most preferably about 80° C., for 10 minutes to 12 hours, preferably 1 to 6 hours.

The reaction mixture may be diluted with an organic solvent prior to the reaction.

Examples of the silane compound having "A" in formula (1) and phenyldimethylsilyl site at ends of the molecular chain include silane compounds having the general formulae (6a), (6b), (6c), and (6d).

[Chem. 21]

(6a)

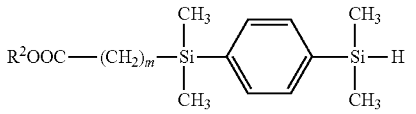

(6b)

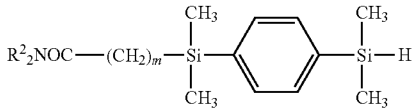

(6c)

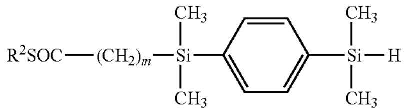

(6d)

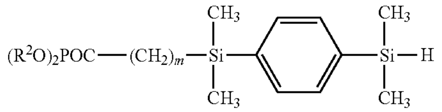

Herein $R^2$ and m are as defined above.

Examples of the silane compound having formula (6a) are shown below.

[Chem. 22]

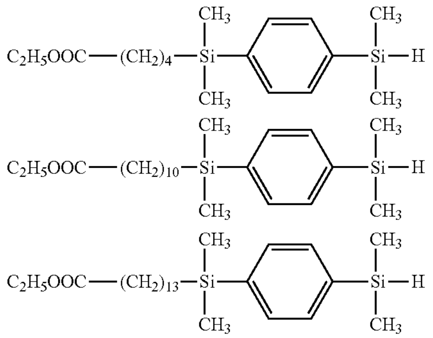

[Chem. 23]

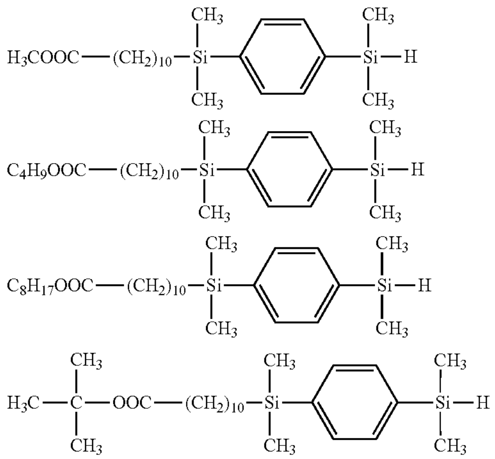

-continued

[Chem. 24]

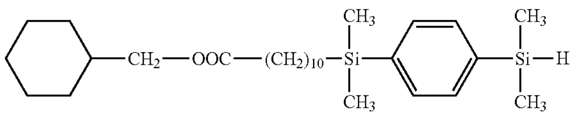
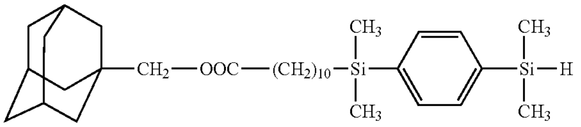
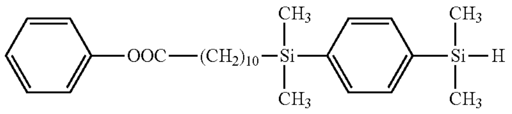
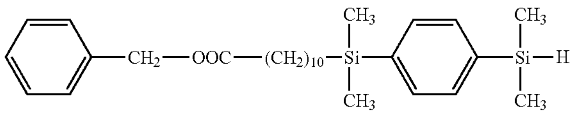

Examples of the silane compound having formula (6b) are shown below.

[Chem. 25]

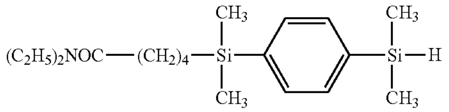
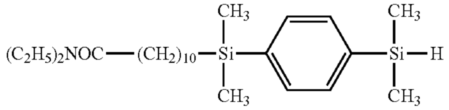
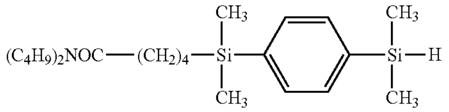
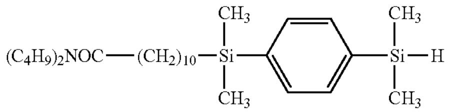

Examples of the silane compound having formula (6c) are shown below.

[Chem. 26]

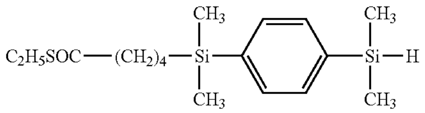
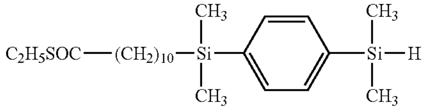
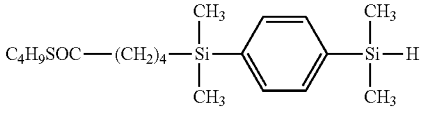

-continued

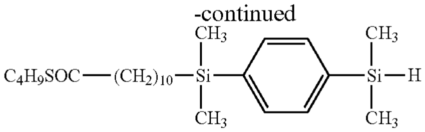
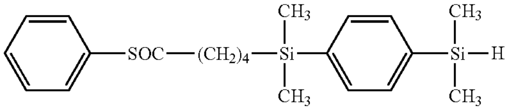
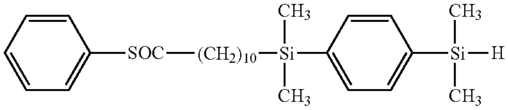

Examples of the silane compound having formula (6d) are shown below.

[Chem. 27]

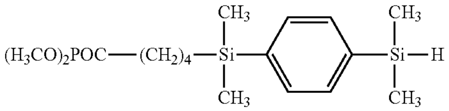
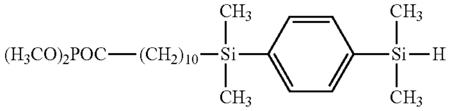
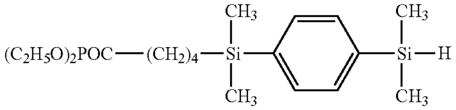
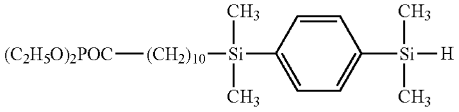

The silane compound having formula (6a), (6b), (6c) or (6d) is prepared, for example, by heating and stirring 1,4-bis(dimethylsilyl)benzene at a temperature of 40 to 120° C., preferably 60 to 100° C., most preferably about 80° C., and adding a hydrosilylation catalyst, for example, toluene solution of chloroplatinic acid/vinylsiloxane complex. Subsequently, a compound having "A" in formula (1) and an olefin site (e.g., alkenyl group) at ends of the molecular chain is slowly added dropwise over time. The reaction mixture is then aged at a temperature of 40 to 120° C., preferably 60 to 100° C., most preferably about 80° C., for 10 minutes to 12 hours, preferably 1 to 6 hours. The reaction mixture may be diluted with an organic solvent prior to the reaction.

Examples of the compound having "A" in formula (1) and an olefin site at ends of the molecular chain are shown below.

[Chem. 28]

$C_2H_5OOC—(CH_2)_2—CH═CH_2$ $C_2H_5OOC—(CH_2)_8—CH═CH_2$ $C_2H_5OOC—(CH_2)_{11}—CH═CH_2$ $H_3COOC—(CH_2)_8—CH═CH_2$ $C_4H_9OOC—(CH_2)_8—CH═CH_2$

-continued $C_8H_{17}OOC—(CH_2)_8—CH{=}CH_2$

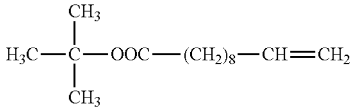

[Chem. 29]

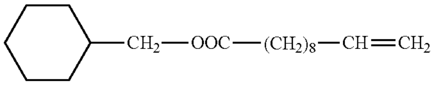

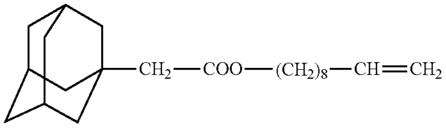

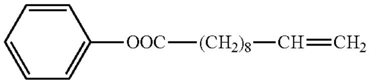

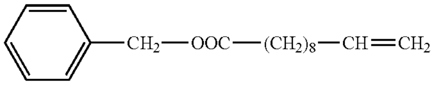

[Chem. 30]

$(C_2H_5)_2NOC—(CH_2)_2—CH{=}CH_2$ $(C_2H_5)_2NOC—(CH_2)_8—CH{=}CH_2$ $(C_4H_9)_2NOC—(CH_2)_2—CH{=}CH_2$ $(C_4H_9)_2NOC—(CH_2)_8—CH{=}CH_2$ $C_2H_5SOC—(CH_2)_2—CH{=}CH_2$ $C_2H_5SOC—(CH_2)_8—CH{=}CH_2$ $C_4H_9SOC—(CH_2)_2—CH{=}CH_2$ $C_4H_9SOC—(CH_2)_8—CH{=}CH_2$

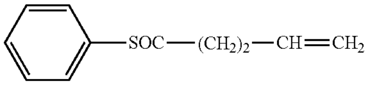

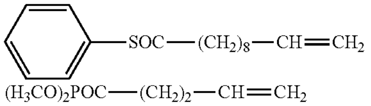

$(H_3CO)_2POC—(CH_2)_2—CH{=}CH_2$ $(H_3CO)_2POC—(CH_2)_8—CH{=}CH_2$ $(C_2H_5O)_2POC—(CH_2)_2—CH{=}CH_2$ $(C_2H_5O)_2POC—(CH_2)_8—CH{=}CH_2$

The compound having "A" in formula (1) and an olefin site at ends of the molecular chain is preferably used in an amount of 0.05 to 0.5 equivalent, more preferably 0.1 to 0.4 equivalent per equivalent of 1,4-bis(dimethylsilyl)benzene.

Examples of the hydrosilylation catalyst used in the preparation of the silane compound having formula (6a), (6b), (6c) or (6d) include platinum group metal based catalysts such as platinum black, chloroplatinic acid, alcohol-modified chloroplatinic acid, complexes of chloroplatinic acid with olefins, aldehydes, vinylsiloxanes, or acetylene alcohols, tetrakis(triphenylphosphine)palladium, and chlorotris(triphenylphosphine)rhodium.

Inter alia, platinum based compounds such as vinylsiloxane coordination compounds are preferred.

The hydrosilylation catalyst is preferably used in such an amount as to give 0.1 to 100 ppm, more preferably 0.5 to 50 ppm of transition metal based on the total weight of 1,4-bis(dimethylsilyl)benzene and the compound having "A" in formula (1) and an olefin site at ends of the molecular chain.

In the preparation of the silane compound having formula (6a), (6b), (6c) or (6d), an organic solvent may be used. Suitable organic solvents include ether solvents such as dibutyl ether, diethyl ether and tetrahydrofuran, and hydrocarbon solvents such as petroleum benzine, toluene and xylene. Of these, toluene is most preferred.

The solvent may be used in an amount of 10 to 300 parts by weight, preferably 50 to 150 parts by weight, most preferably about 100 parts by weight per 100 parts by weight of the compound having "A" in formula (1) and an olefin site at ends of the molecular chain.

Through the subsequent steps of quenching the reaction and distilling off the solvent, the silane compound having formula (6a), (6b), (6c) or (6d) is obtained.

Shown below are examples of the compound having a hydrolyzable silyl group and an olefin site (e.g., alkenyl group) at ends of the molecular chain, which is used in the preparation of the organosilane or siloxane compound having formula (1).

$CH_2{=}CH—Si(OCH_3)_3$ $CH_2{=}CH—CH_2—Si(OCH_3)_3$ $CH_2{=}CH—(CH_2)_4—Si(OCH_3)_3$ $CH_2{=}CH—(CH_2)_6—Si(OCH_3)_3$ (31)

The compound having a hydrolyzable silyl group and an olefin site at ends of the molecular chain is preferably used in an amount of 1 to 5 equivalents, more preferably 1.1 to 2.5 equivalents per equivalent of the silane compound having "A" in formula (1) and phenyldimethylsilyl site at ends of the molecular chain.

Examples of the hydrosilylation catalyst used in the preparation of the organosilane or siloxane compound having formula (1) include platinum group metal based catalysts such as platinum black, chloroplatinic acid, alcohol-modified chloroplatinic acid, complexes of chloroplatinic acid with olefins, aldehydes, vinylsiloxanes, or acetylene alcohols, tetrakis(triphenylphosphine)palladium, and chlorotris(triphenylphosphine)rhodium. Inter alia, platinum based compounds such as vinylsiloxane coordination compounds are preferred.

The hydrosilylation catalyst is preferably used in such an amount as to give 0.1 to 100 ppm, more preferably 0.2 to 50 ppm of transition metal based on the total weight of the silane compound having a site containing "A" and phenyldimethylsilyl site at ends of the molecular chain and the compound having a hydrolyzable silyl group and an olefin site at ends of the molecular chain.

In the preparation of the organosilane or siloxane compound having formula (1), an organic solvent may be used. Suitable organic solvents include ether solvents such as dibutyl ether, diethyl ether and tetrahydrofuran, and hydrocarbon solvents such as petroleum benzine, toluene and xylene. Of these, toluene is most preferred.

The solvent may be used in an amount of 10 to 300 parts by weight, preferably 50 to 150 parts by weight per 100 parts by weight of the compound having an ester site and a phenyldimethylsilyl site at ends of the molecular chain.

Through the subsequent steps of quenching the reaction and distilling off the solvent and unreacted reactants, the organosilane or siloxane compound having formula (1) is obtained.

Component (A) may contain a partial (hydrolytic) condensate obtained from condensation of hydroxyl groups on the organosilane or siloxane compound having formula (1), or hydroxyl groups which are obtained from partial hydrolysis of terminal hydrolyzable groups on the organosilane or siloxane compound by a well-known method.

Component (B) is selected from among organosilane or siloxane compounds having the general formula (2) and partial (hydrolytic) condensates thereof. It may be one compound or a mixture of two or more compounds.

[Chem. 32]

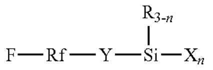
(2)

Herein Rf is a perfluoroalkylene group or divalent perfluoropolyether group, Y, R, X and n are as defined above.

In formula (2), Rf is a perfluoroalkylene group or divalent perfluoropolyether group. Suitable perfluoroalkylene groups include perfluoroalkylene groups of 3 to 12 carbon atoms, with specific groups being shown below.

$—CF_2CF_2CF_2—$ $—CF_2CF_2CF_2CF_2—$ $—CF_2CF_2CF_2CF_2CF_2—$ $—CF_2CF_2CF_2CF_2CF_2CF_2—$ $—CF_2CF_2CF_2CF_2CF_2CF_2CF_2—$ $—CF_2CF_2CF_2CF_2CF_2CF_2CF_2CF_2—$ $—CF_2CF_2CF_2CF_2CF_2CF_2CF_2CF_2CF_2—$ $—CF_2CF_2CF_2CF_2CF_2CF_2CF_2CF_2CF_2CF_2—$ $—CF_2CF_2CF_2CF_2CF_2CF_2CF_2CF_2CF_2CF_2CF_2—$ $CF_2CF_2CF_2CF_2CF_2CF_2CF_2CF_2CF_2CF_2CF_2CF_2—$ (33)

Suitable divalent perfluoropolyether groups include groups of the structure having $C_1$-$C_3$ perfluoroalkylene groups and oxygen atoms alternately linked (structure of repeating perfluorooxyalkylene units of one or more types). The $C_1$-$C_3$ perfluoroalkylene groups may be of one type or a mixture of plural types. Typical divalent perfluoropolyether groups are represented by the general formula (3).

[Chem. 34]

$$—(J—O)_b—J— \quad (3)$$

Herein J is at least one group selected from perfluoroalkylene groups having the structural formulae (a) to (e):

[Chem. 35]

$—CF_2—$ (a)

$—CF_2CF_2—$ (b)

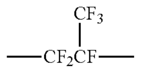
(c)

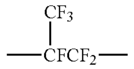
(d)

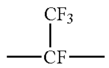
(e)

and all J in formula (3) may have the same structure, or —J—O— structures of plural types may be arrayed randomly or blockwise, and b indicative of the number of repeating units is from 3 to 6.

Examples of the organosilane or siloxane compound having formula (2) are shown by the following formulae.

[Chem. 36]

$CF_3(CF_2)_3—(CH_2)_2—Si(OCH_3)_3$ $CF_3(CF_2)_5—(CH_2)_2—Si(OCH_3)_3$ $CF_3(CF_2)_7—(CH_2)_2—Si(OCH_3)_3$

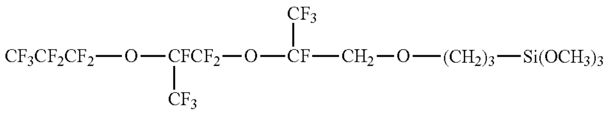

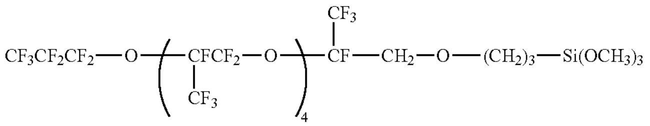

[Chem. 37]

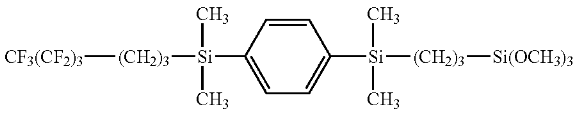

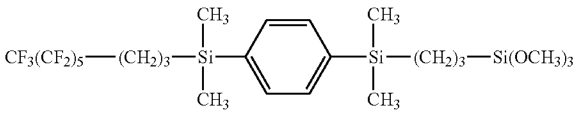

-continued

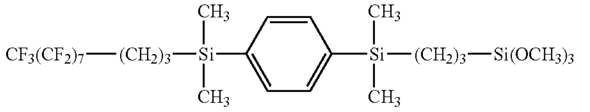

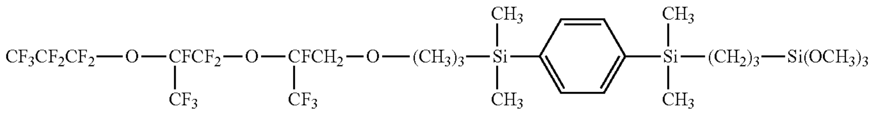

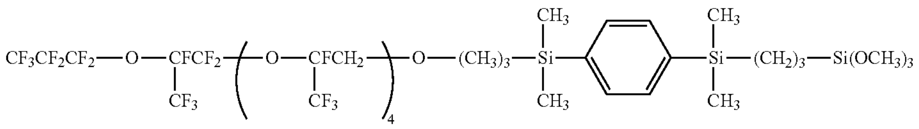

[Chem. 38]

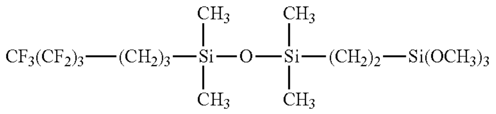
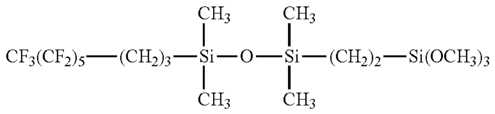

[Chem. 39]

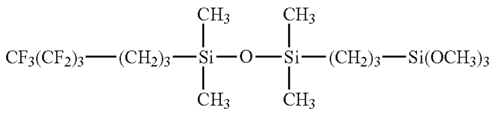
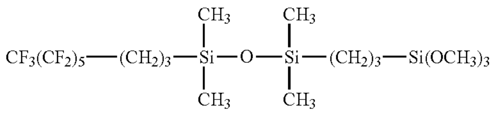

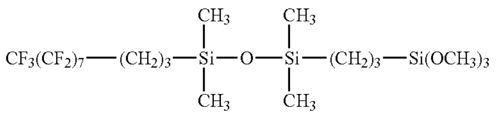

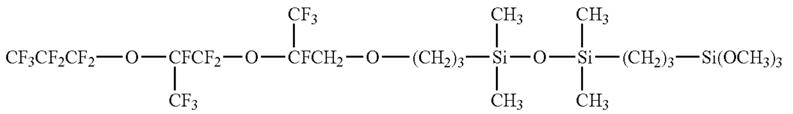

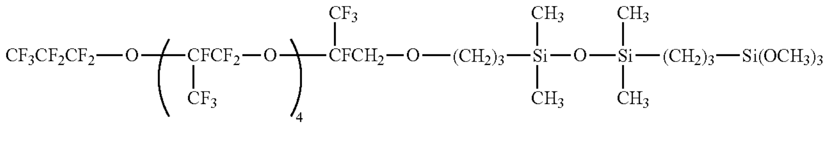

The following method is exemplary of the method for preparing the organosilane or siloxane compound having formula (2), especially the organosilane or siloxane compound having formula (2) wherein Y contains a $C_2$-$C_{20}$ alkylene group, silalkylene group or silarylene group.

The desired compound is prepared by heating and stirring a silane or siloxane compound having a F-Rf site in formula (2) and a dimethylsilyl site at ends of the molecular chain at a temperature of 40 to 120° C., preferably 60 to 100° C., most preferably about 80° C. and adding a hydrosilylation catalyst, for example, toluene solution of chloroplatinic acid/vinylsiloxane complex. Subsequently, a compound having a hydrolyzable silyl group and an olefin site (e.g., alkenyl group) at ends of the molecular chain is added dropwise. The reaction mixture is then aged at a temperature of 40 to 120° C., preferably 60 to 100° C., most preferably about 80° C., for 10 minutes to 12 hours, preferably 1 to 6 hours. The reaction mixture may be diluted with an organic solvent prior to the reaction.

Examples of the silane or siloxane compound having a F-Rf site in formula (2) and a dimethylsilyl site at ends of the molecular chain include silane or siloxane compounds having the general formula (7a) or (7b).

[Chem. 40]

(7a)

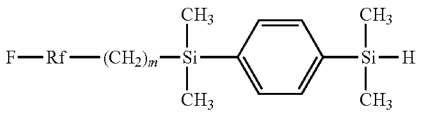

(7b)

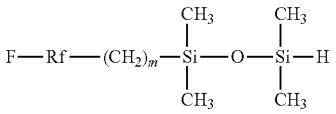

Herein m is as defined above.

Examples of the silane compound having formula (7a) are shown below.

[Chem. 41]

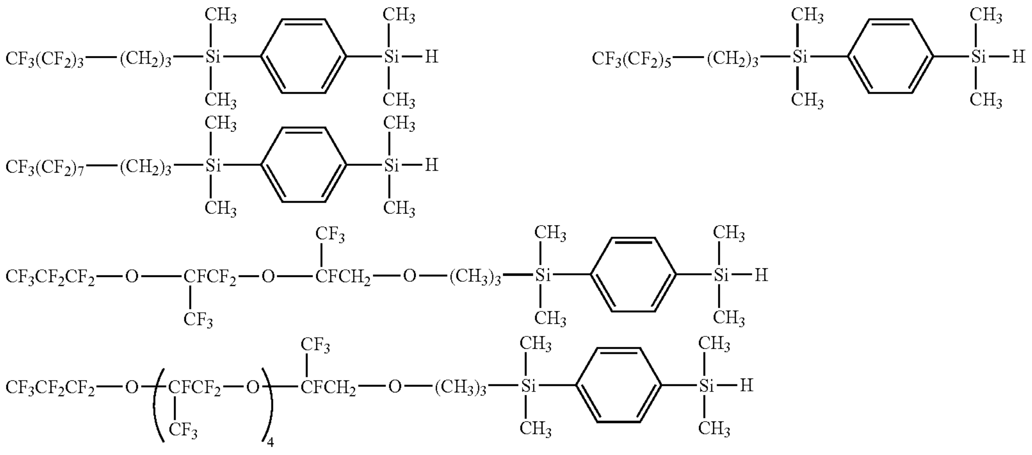

Examples of the siloxane compound having formula (7b) are shown below.

[Chem. 42]

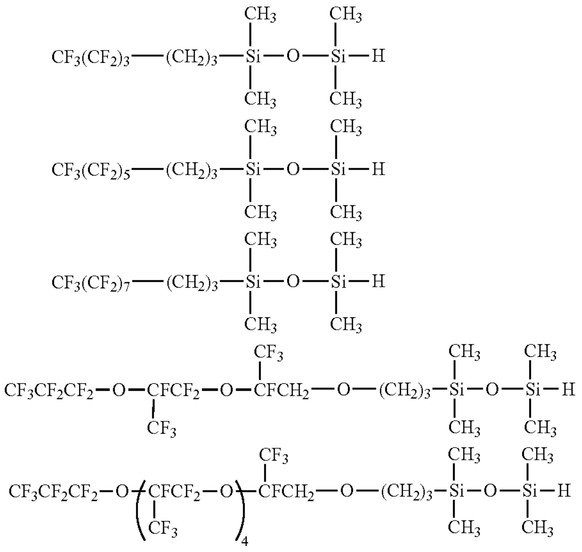

The silane or siloxane compounds having formula (7a) or (7b) is prepared by heating and stirring 1,4-bis(dimethylsilyl)benzene or bis(dimethylsilyl) ether at a temperature of 40 to 120° C., preferably 60 to 100° C. and adding a hydrosilylation catalyst, for example, toluene solution of chloroplatinic acid/vinylsiloxane complex. Subsequently, a compound having a F-Rf site in formula (2) and an olefin site (e.g., alkenyl group) at ends of the molecular chain is slowly added dropwise over time. The reaction mixture is then aged at a temperature of 40 to 120° C., preferably 60 to 100° C., for 10 minutes to 12 hours, preferably 1 to 6 hours. The reaction mixture may be diluted with an organic solvent prior to the reaction.

Examples of the compound having a F-Rf site in formula (2) and an olefin site at ends of the molecular chain are shown below.

[Chem. 43]

$CF_3(CF_2)_3—CH_3—CH{=}CH_2$ $CF_3(CF_2)_5—CH_3—CH{=}CH_2$

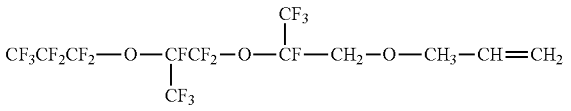

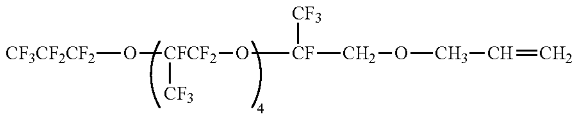

[Chem. 44]

$CF_3(CF_2)_3—(CH_3)_2—CH{=}CH_2$ $CF_3(CF_2)_5—(CH_3)_2—CH{=}CH_2$

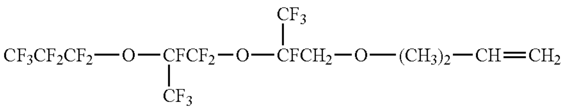

-continued

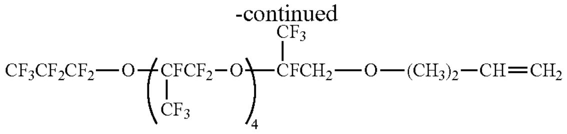

The compound having a F-Rf site in formula (2) and an olefin site at ends of the molecular chain is preferably used in an amount of 0.05 to 0.5 equivalent, more preferably 0.1 to 0.4 equivalent per equivalent of 1,4-bis(dimethylsilyl) benzene or bis(dimethylsilyl) ether.

Examples of the hydrosilylation catalyst used in the preparation of the silane or siloxane compound having formula (7a) or (7b) include platinum group metal based catalysts such as platinum black, chloroplatinic acid, alcohol-modified chloroplatinic acid, complexes of chloroplatinic acid with olefins, aldehydes, vinylsiloxanes, or acetylene alcohols, tetrakis(triphenylphosphine)palladium, and chlorotris(triphenylphosphine)rhodium. Inter alia, platinum based compounds such as vinylsiloxane coordination compounds are preferred.

The hydrosilylation catalyst is preferably used in such an amount as to give 0.1 to 100 ppm, more preferably 0.2 to 50 ppm of transition metal based on the total weight of 1,4-bis (dimethylsilyl)benzene or bis(dimethylsilyl) ether and the compound having a F-Rf site in formula (2) and an olefin site at ends of the molecular chain.

In the preparation of the silane or siloxane compound having formula (7a) or (7b), an organic solvent may be used. Suitable organic solvents include ether solvents such as dibutyl ether, diethyl ether and tetrahydrofuran, and hydrocarbon solvents such as petroleum benzine, toluene and xylene. Of these, toluene is most preferred.

The solvent may be used in an amount of 10 to 300 parts by weight, preferably 50 to 150 parts by weight per 100 parts by weight of the compound having a F-Rf site in formula (2) and an olefin site at ends of the molecular chain.

Through the subsequent steps of quenching the reaction and distilling off the solvent, the silane or siloxane compound having formula (7a) or (7b) is obtained.

Shown below are examples of the compound having a hydrolyzable silyl group and an olefin site (e.g., alkenyl group) at ends of the molecular chain, which is used in the preparation of the organosilane or siloxane compound having formula (2).

$CH_2{=}CH{-}Si(OCH_3)_3$ $CH_2{=}CH{-}CH_2{-}Si(OCH_3)_3$ $CH_2{-}CH{-}(CH_2)_4{-}Si(OCH_3)_3$ $CH_2{-}CH{-}(CH_2)_6{-}Si(OCH_3)_3$ (45)

The compound having a hydrolyzable silyl group and an olefin site at ends of the molecular chain is preferably used in an amount of 1 to 5 equivalents, more preferably 1 to 2 equivalents per equivalent of the silane compound having a F-Rf site in formula (2) and dimethylsilyl site at ends of the molecular chain.

Examples of the hydrosilylation catalyst used in the preparation of the organosilane or siloxane compound having formula (2) include platinum group metal based catalysts such as platinum black, chloroplatinic acid, alcohol-modified chloroplatinic acid, complexes of chloroplatinic acid with olefins, aldehydes, vinylsiloxanes, or acetylene alcohols, tetrakis(triphenylphosphine)palladium, and chlorotris (triphenylphosphine)rhodium. Inter alia, platinum based compounds such as vinylsiloxane coordination compounds are preferred.

The hydrosilylation catalyst is preferably used in such an amount as to give 0.1 to 100 ppm, more preferably 0.2 to 50 ppm of transition metal based on the total weight of the silane or siloxane compound having a F-Rf site in formula (2) and dimethylsilyl site at ends of the molecular chain and the compound having a hydrolyzable silyl group and an olefin site at ends of the molecular chain.

In the preparation of the organosilane or siloxane compound having formula (2), an organic solvent may be used. Suitable organic solvents include ether solvents such as dibutyl ether, diethyl ether and tetrahydrofuran, and hydrocarbon solvents such as petroleum benzine, toluene and xylene. Of these, toluene is most preferred.

The solvent may be used in an amount of 10 to 300 parts by weight, preferably 50 to 150 parts by weight, most preferably about 100 parts by weight per 100 parts by weight of the silane or siloxane compound having a F-Rf site in formula (2) and dimethylsilyl site at ends of the molecular chain.

Through the subsequent steps of quenching the reaction and distilling off the solvent, the organosilane or siloxane compound having formula (2) is obtained.

For example, when a compound having the following formula:

[Chem. 46]

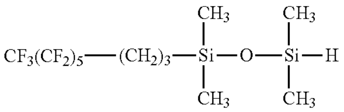

is used as the siloxane compound having a F-Rf site in formula (2) and dimethylsilyl site at ends of the molecular chain and a compound having the following formula:

$CH_2{=}CH{-}Si(OCH_3)_3$ (47)

is used as the compound having a hydrolyzable silyl group and an olefin site at ends of the molecular chain, there is obtained a siloxane compound having the following formula.

[Chem. 48]

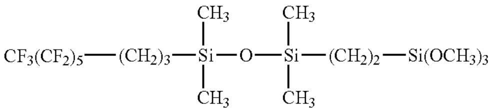

Component (B) may contain a partial (hydrolytic) condensate obtained from condensation of hydroxyl groups on the organosilane or siloxane compound having formula (2), or hydroxyl groups which are obtained from partial hydrolysis of terminal hydrolyzable groups on the organosilane or siloxane compound by a well-known method.

The coating composition of the invention contains one or more compounds selected from among the organosilane or siloxane compounds having a hydrolyzable group and a lipophilic group and partial (hydrolytic) condensates thereof, component (A) and one or more compounds selected from among the organosilane or siloxane compounds having a hydrolyzable group and a fluorinated organic group (specifically perfluoroalkyl or perfluoropolyether group) and partial (hydrolytic) condensates thereof, component (B) in a specific weight ratio, i.e., (A):(B) of from 50:50 to 90:10, preferably from 60:40 to 80:20, with the proviso that the total of components (A) and (B) is 100. If component (A) is too less, i.e., if component (B) is too much, then the coating composition is oil repellent so that the coating surface repels the sebum in fingerprints, causing fingerprints to look conspicuous. If component (A) is too much, i.e., if component (B) is too less, then the coating composition is highly lipophilic so that much sebum deposits on the coating, causing fingerprints to look conspicuous.

The invention also provides a surface treating agent comprising the coating composition.

The surface treating agent may further comprise a solvent. Suitable solvents include alcohol solvents such as propylene glycol monomethyl ether (PGME), butanol and isopropanol, ether solvents such as dibutyl ether, diethyl ether and tetrahydrofuran, hydrocarbon solvents such as petroleum benzine, toluene and xylene, ketone solvents such as acetone, methyl ethyl ketone, and methyl isobutyl ketone. Inter alia, alcohol solvents and ether solvents are desirable in view of solubility and wettability, with PGME and dibutyl ether being most desirable.

The solvents may be used in admixture of two or more while it is preferred that components (A) and (B) be uniformly dissolved in the solvent. An optimum concentration of components (A) and (B) in the solvent varies with a particular treating mode. The amount which is easy to weigh may be chosen. In the case of direct coating, the concentration is preferably 0.01 to 10 parts by weight, more preferably 0.05 to 5 parts by weight per 100 parts by weight of the solvent and the mixture of components (A) and (B) (or coating composition) combined. In the case of evaporation treatment, the concentration is preferably 1 to 100 parts by weight, more preferably 3 to 30 parts by weight per 100 parts by weight of the solvent and the mixture of components (A) and (B) (or coating composition) combined. In the case of wet treatment, the concentration is preferably 0.01 to 10 parts by weight, more preferably 0.05 to 1 part by weight per 100 parts by weight of the solvent and the mixture of components (A) and (B) (or coating composition) combined.

To the surface treating agent, a hydrolytic condensation catalyst may be added. Suitable hydrolytic condensation catalysts include organotin compounds such as dibutyltin dimethoxide and dibutyltin dilaurate, organotitanium compounds such as tetra-n-butyl titanate, organic acids such as acetic acid and methanesulfonic acid, and inorganic acids such as hydrochloric acid, sulfuric acid and phosphoric acid. Of these, acetic acid, tetra-n-butyl titanate, and dibutyltin dilaurate are desirable.

The hydrolytic condensation catalyst is preferably added in an amount of 0.1 to 150 parts, more preferably 25 to 125 parts, even more preferably 50 to 110 parts by weight per 100 parts by weight of the mixture of components (A) and (B) (or coating composition).

The surface treating agent may be applied to a substrate by any well-known techniques such as brush coating, dipping, spraying, evaporation, and wet treatment. In the case of evaporation, the heating mode may be either resistance heating or EB heating and is not particularly limited. The curing temperature varies with a particular curing technique. For example, in the case of direct coating (brush coating, dipping or spraying), suitable curing conditions include a temperature of 25 to 200° C., especially 25 to 150° C. for 15 minutes to 36 hours, especially 30 minutes to 24 hours. Curing under humid conditions (50 to 90% RH) is also useful. When the coating technique is evaporation, the desirable temperature is in a range of 20 to 200° C. Curing under humid conditions (50 to 90% RH) is also useful. Further, in the case of wet coating, desirable conditions include room temperature (25° C.±10° C.) and 1 to 24 hours. Cure may be briefly completed by heating at 30 to 200° C. for 1 minute to 1 hour. Curing under humid conditions (50 to 90% RH) is also useful.

The cured coating typically has a thickness of 0.1 to 100 nm, desirably 1 to 20 nm although the thickness is selected depending on the type of substrate. Also, in the case of spray coating, for example, a procedure involving diluting the agent with an organic solvent having water previously added thereto, for thereby effecting hydrolysis to generate Si—OH, and thereafter, spraying the dilution is recommended because the coating rapidly cures.

The surface treating agent, in which lipophilic molecules as component (A) and oil-repellent molecules as component (B) are uniformly mixed in an appropriate balance, cures into a film having a contact angle with oleic acid of preferably up to 30°, more preferably up to 25° as measured at 25° C. and relative humidity 40% by a contact angle meter Drop Master (Kyowa Interface Science Co., Ltd.). When fingerprints (or sebum) are put to the cured film, the fingerprints look inconspicuous because of low visibility due to a small contact angle.

The surface treating agent, in which lipophilic molecules as component (A) and oil-repellent molecules as component (B) are uniformly mixed in an appropriate balance, cures into a film having a haze of preferably up to 10, more preferably up to 7 as measured by a haze meter NDH 5000 (Nippon Denshoku Industries Co., Ltd.) when sebum is deposited to the cured film under a load of 1 kg. When fingerprints (or sebum) are put to the cured film, the fingerprints look inconspicuous because of low visibility due to a low haze.

The substrate to be treated with the surface treating agent is not particularly limited, and may be made of any desired materials including paper, fabric, metals, metal oxides, glass, plastics, ceramics, and quartz. The surface treating agent is effective for endowing the substrate with water/oil repellency. In particular, the surface treating agent is advantageously used for the treatment of $SiO_2$-deposited glass and film.

Preferred articles which may be treated with the surface treating agent include car navigation systems, mobile phones, smart phones, digital cameras, digital video cameras, PDA, portable audio players, car audio players, game consoles, eyeglass lenses, camera lenses, lens filters, sunglasses, medical instruments (e.g., gastroscopes), copiers, personal computers, LC displays, organic EL displays, plasma displays, touch panel displays, protective film, antireflective film, and other optical articles. The surface treating agent ensures that fingerprints and sebum, when put to the article, are difficultly visible. Therefore, it is particularly useful as a lipophilic layer on touch panel displays and antireflective films.

EXAMPLES

Synthesis Examples, Examples and Comparative Examples are given below for illustrating the invention, but the invention is not limited by Examples.

[Preparation of Component (A) or Lipophilic Group-Containing Silane]

Synthesis Example 1

A reactor was charged with 45.7 g ($2.35\times10^{-1}$ mol) of 1,4-bis(dimethylsilyl)benzene, which was heated at 80° C.

Then $1.0 \times 10^{-2}$ g of a toluene solution of chloroplatinic acid/vinylsiloxane complex (containing $0.3 \times 10^{-6}$ mol of Pt) was added, after which 10.0 g ($4.71 \times 10^{-2}$ mol) of ethyl undecenoate was added dropwise over 3 hours. This was followed by heating and stirring for 1 hour. The solvent and unreacted reactants were distilled off under reduced pressure, obtaining 18.0 g of a compound having the formula (A).

[Chem. 49]

(A)

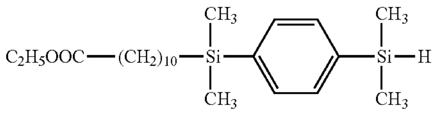

$^1$H-NMR

δ 0.2-0.4 (—Si—$C\underline{H}_3$) 12H

δ 0.7 (—$(CH_2)_7C\underline{H}_2$—Si—) 2H

δ 1.2-1.5 (—$(C\underline{H}_2)_7$—, —$OCH_2C\underline{H}_3$) 17H

δ 1.6 (—OOC—$CH_2C\underline{H}_2(CH_2)_7CH_2$—Si—) 2H

δ 2.3 (—OOC—$C\underline{H}_2$—) 2H

δ 4.1 (—$OC\underline{H}_2CH_3$) 2H

δ 4.4 (—Si—H) 1H

δ 7.5 (—Si—$C_6\underline{H}_4$—Si—) 4H

A reactor was charged with 10.0 g ($2.46 \times 10^{-2}$ mol) of the compound having formula (A).

[Chem. 50]

(A)

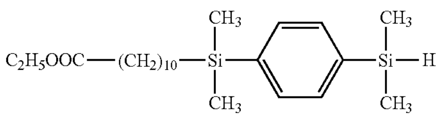

It was heated at 80° C. Then $1.0 \times 10^{-2}$ g of toluene solution of chloroplatinic acid/vinylsiloxane complex (containing $0.3 \times 10^{-6}$ mol of Pt) was added, after which 8.00 g ($4.92 \times 10^{-2}$ mol) of allyltrimethoxysilane was added dropwise. This was followed by heating and stirring for 3 hours. The solvent and unreacted reactants were distilled off under reduced pressure, obtaining 13.1 g of compound 1 having the formula (B).

[Chem. 51]

(B)

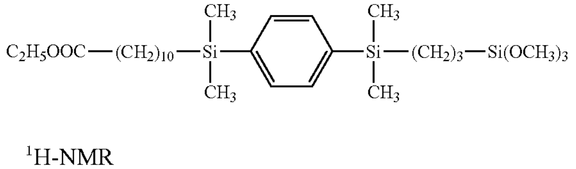

$^1$H-NMR

δ 0.2-0.3 (—Si—$C\underline{H}_3$) 12H

δ 0.7 (—$(CH_2)_7C\underline{H}_2$—Si—, —$SiC\underline{H}_2CH_2CH_2$—$Si(OCH_3)_3$) 4H δ 0.8 (—$SiCH_2CH_2C\underline{H}_2$—$Si(OCH_3)_3$) 2H δ 1.2-1.4 (—$(C\underline{H}_2)_7$—, —$OCH_2C\underline{H}_3$) 17H δ 1.5 (—$SiCH_2C\underline{H}_2CH_2$—$Si(OCH_3)_3$) 2H δ 1.6 (—OOC—$CH_2C\underline{H}_2(CH_2)_7CH_2$—Si—) 2H δ 2.3 (—OOC—$C\underline{H}_2$—) 2H δ 3.5 (—$SiCH_2CH_2CH_2$—$Si(OC\underline{H}_3)_3$) 9H δ 4.1 (—$OC\underline{H}_2CH_3$) 2H δ 7.5 (—Si—$C_6\underline{H}_4$—Si—) 4H Synthesis Example 2

A reactor was charged with 35.4 g ($1.82 \times 10^{-1}$ mol) of 1,4-bis(dimethylsilyl)benzene, which was heated at 80° C. Then $1.0 \times 10^{-2}$ g of toluene solution of chloroplatinic acid/vinylsiloxane complex (containing $0.3 \times 10^{-6}$ mol of Pt) was added, after which 10.0 g ($3.64 \times 10^{-2}$ mol) of benzyl undecenoate was added dropwise over 3 hours. This was followed by heating and stirring for 1 hour. The solvent and unreacted reactants were distilled off under reduced pressure, obtaining 14.4 g of a compound having the formula (C).

[Chem. 52]

(C)

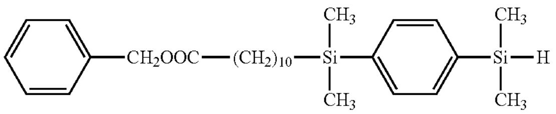

$^1$H-NMR

δ 0.2-0.4 (—Si—$C\underline{H}_3$) 12H

δ 0.7 (—$(CH_2)_7C\underline{H}_2$—Si—) 2H

δ 1.2-1.5 (—$(C\underline{H}_2)_7$—) 14H

δ 1.6 (—OOC—$CH_2C\underline{H}_2(CH_2)_7CH_2$—Si—) 2H

δ 2.3 (—OOC—$C\underline{H}_2$—) 2H

δ 4.4 (—Si—H) 1H

δ 5.1 (—$OC\underline{H}_2$—$C_6H_5$) 2H

δ 7.3 (—$OCH_2$—$C_6\underline{H}_5$) 5H

δ 7.5 (—Si—$C_6\underline{H}_4$—Si—) 4H

A reactor was charged with 10.0 g ($2.13 \times 10^{-2}$ mol) of the compound having formula (C).

[Chem. 53]

(C)

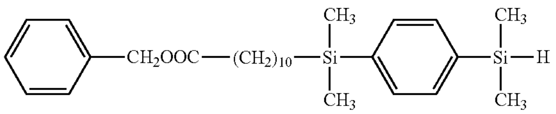

It was heated at 80° C. Then $1.0 \times 10^{-2}$ g of toluene solution of chloroplatinic acid/vinylsiloxane complex (containing $0.3 \times 10^{-6}$ mol of Pt) was added, after which 4.9 g ($2.99 \times 10^{-2}$ mol) of allyltrimethoxysilane was added dropwise. This was followed by heating and stirring for 3 hours. The solvent and unreacted reactants were distilled off under reduced pressure, obtaining 9.9 g of compound 2 having the formula (D).

[Chem. 54]

(D)

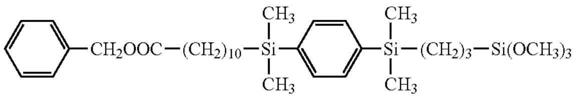

$^1$H-NMR

δ 0.2-0.3 (—Si—$C\underline{H}_3$) 12H

δ 0.7 (—$(CH_2)_7C\underline{H}_2$—Si—, —$SiCH_2CH_2CH_2$—$Si(OCH_3)_3$) 4H

δ 0.8 (—$SiCH_2CH_2C\underline{H}_2$—$Si(OCH_3)_3$) 2H

δ 1.2-1.4 (—$(C\underline{H}_2)_7$—) 14H

δ 1.5 (—$SiCH_2C\underline{H}_2CH_2$—$Si(OCH_3)_3$) 2H

δ 1.6 (OOC—$CH_2C\underline{H}_2(CH_2)_7CH_2$—Si—) 2H

δ 2.3 (—OOC—$C\underline{H}_2$—) 2H

δ 3.5 (—$SiCH_2CH_2CH_2$—$Si(OC\underline{H}_3)_3$) 9H

δ 5.1 (—$OC\underline{H}_2$—$C_6H_5$) 2H

δ 7.3 (—$OCH_2$—$C_6\underline{H}_5$) 5H

δ 7.5 (—Si—$C_6\underline{H}_4$—Si—) 4H

Synthesis Example 3

A reactor was charged with 34.7 g ($1.78\times10^{-1}$ mol) of 1,4-bis(dimethylsilyl)benzene, which was heated at 80° C. Then $1.0\times10^{-2}$ g of toluene solution of chloroplatinic acid/vinylsiloxane complex (containing $0.3\times10^{-6}$ mol of Pt) was added, after which 10.0 g ($3.57\times10^{-2}$ mol) of cyclohexylmethyl undecenoate was added dropwise over 3 hours. This was followed by heating and stirring for 1 hour. The solvent and unreacted reactants were distilled off under reduced pressure, obtaining 13.1 g of a compound having the formula (E).

[Chem. 55]

(E)

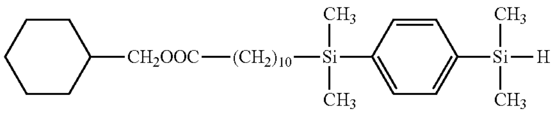

$^1$H-NMR

δ 0.2-0.4 (—Si—$C\underline{H}_3$) 12H

δ 0.7 (—$(CH_2)_7C\underline{H}_2$—Si—) 2H

δ 1.2-1.5 (—$(C\underline{H}_2)_7$—, —$OCH_2$—$C_6\underline{H}_{11}$) 25H

δ 1.6 (—OOC—$CH_2C\underline{H}_2(CH_2)_7CH_2$—Si—) 2H

δ 2.3 (—OOC—$C\underline{H}_2$—) 2H

δ 3.9 (—$OC\underline{H}_2$—$C_6H_{11}$) 2H

δ 4.4 (—Si—$\underline{H}$) 1H

δ 7.5 (—Si—$C_6\underline{H}_4$—Si—) 4H

A reactor was charged with 8.0 g ($1.68\times10^{-2}$ mol) of the compound having formula (E).

[Chem. 56]

(E)

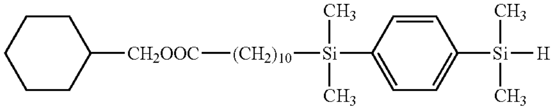

It was heated at 80° C. Then $1.0\times10^{-2}$ g of toluene solution of chloroplatinic acid/vinylsiloxane complex (containing $0.3\times10^{-6}$ mol of Pt) was added, after which 3.8 g ($2.36\times10^{-2}$ mol) of allyltrimethoxysilane was added dropwise. This was followed by heating and stirring for 3 hours. The solvent and unreacted reactants were distilled off under reduced pressure, obtaining 6.9 g of compound 3 having the formula (F).

[Chem. 57]

(F)

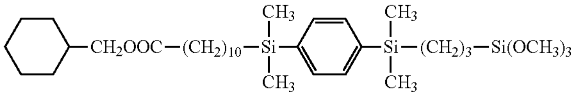

$^1$H-NMR

δ 0.2-0.3 (—Si—$C\underline{H}_3$) 12H

δ 0.7 (—$(CH_2)_7C\underline{H}_2$—Si—, —$SiC\underline{H}_2CH_2CH_2$—$Si(OCH_3)_3$) 4H δ 0.8 (—$SiCH_2CH_2C\underline{H}_2$—$Si(OCH_3)_3$) 2H δ 1.2-1.5 (—$(C\underline{H}_2)_7$—, —$OCH_2$—$C_6\underline{H}_{11}$) 25H δ 1.5 (—$SiCH_2C\underline{H}_2CH_2$—$Si(OCH_3)_3$) 2H δ 1.6 (—OOC—$CH_2C\underline{H}_2(CH_2)_7CH_2$—Si—) 2H δ 2.3 (—OOC—$C\underline{H}_2$—) 2H δ 3.5 (—$SiCH_2CH_2CH_2$—$Si(OC\underline{H}_3)3$) 9H δ 3.9 (—$OC\underline{H}_2$—$C_6H_{11}$) 2H δ 7.5 (—Si—$C_6\underline{H}_4$—Si—) 4H Synthesis Example 4

A reactor was charged with 10.0 g ($2.46\times10^{-2}$ mol) of the compound having formula (A) in Synthesis Example 1.

[Chem. 58]

(A)

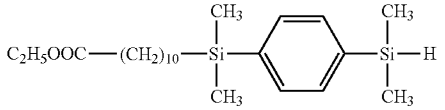

It was heated at 80° C. Then $1.0\times10^{-2}$ g of toluene solution of chloroplatinic acid/vinylsiloxane complex (containing $0.3\times10^{-6}$ mol of Pt) was added, after which 8.0 g ($3.44\times10^{-2}$ mol) of 7-octenyltrimethoxysilane was added dropwise. This was followed by heating and stirring for 3 hours. The solvent and unreacted reactants were distilled off under reduced pressure, obtaining 13.4 g of compound 4 having the formula (G).

[Chem. 59]

(G)

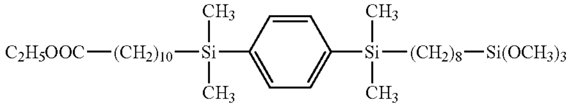

$^1$H-NMR

δ 0.2-0.3 (—Si—$C\underline{H}_3$) 12H

δ 0.7 (—$(CH_2)_7C\underline{H}_2$—Si—, —$SiC\underline{H}_2(CH_2)_6CH_2$—$Si(OCH_3)_3$) 4H δ 0.8 (—$SiCH_2(CH_2)_6C\underline{H}_2$—$Si(OCH_3)_3$) 2H δ 1.2-1.4 (—$(C\underline{H}_2)_7$—, —$OCH_2C\underline{H}_3$) 17H δ 1.5 (—$SiCH_2(C\underline{H}_2)_6CH_2$—$Si(OCH_3)_3$) 12H δ 1.6 (—OOC—$CH_2C\underline{H}_2(CH_2)_7CH_2$—Si—) 2H δ 2.3 (—OOC—$C\underline{H}_2$—) 2H δ 3.5 (—$SiCH_2(CH_2)_6CH_2$—$Si(OC\underline{H}_3)_3$) 9H δ 4.1 (—$OC\underline{H}_2CH_3$) 2H δ 7.5 (—Si—$C_6\underline{H}_4$—Si—) 4H

[Preparation of Component (B) or Fluorocarbon Group-Containing Silane or Siloxane]

Synthesis Example 5

A reactor was charged with 18.6 g ($9.58\times10^{-2}$ mol) of 1,4-bis(dimethylsilyl)benzene, which was heated at 80° C. Then $1.0\times10^{-2}$ g of toluene solution of chloroplatinic acid/vinylsiloxane complex (containing $0.3\times10^{-6}$ mol of Pt) was added, after which 10.0 g ($1.92\times10^{-2}$ mol) of $CF_3CF_2CF_2$—O—$CF(CF_3)CF_2$—O—$CF(CF_3)$—$CH_2$—O—$CH_2CH{=}CH_2$ was added dropwise over 3 hours. This was followed by heating and stirring for 1 hour. The solvent and unreacted reactants were distilled off under reduced pressure, obtaining 8.0 g of a compound having the formula (H).

[Chem. 60]

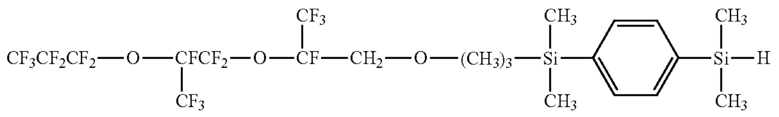

(H)

$^1$H-NMR

δ 0.2-0.4 (—Si—$C\underline{H_3}$) 12H

δ 0.7 (—$(CH_2)_2C\underline{H_2}$—Si—) 2H

δ 1.6 (—O—$CH_2C\underline{H_2}CH_2$—Si—) 2H

δ 3.5 (O—$OC\underline{H_2}$—) 2H

δ 3.9 (—$OC\underline{H_2}CF_2$) 2H

δ 4.4 (—Si—$\underline{H}$) 1H

δ 7.5 (—Si—$C_6\underline{H_4}$—Si—) 4H

A reactor was charged with 7.0 g ($9.77\times10^{-3}$ mol) of the compound having formula (H).

[Chem. 61]

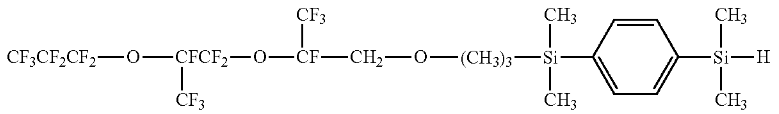

(H)

It was heated at 80° C. Then $1.0\times10^{-2}$ g of toluene solution of chloroplatinic acid/vinylsiloxane complex (containing $0.3\times10^{-6}$ mol of Pt) was added, after which 2.2 g ($1.37\times10^{-2}$ mol) of allyltrimethoxysilane was added dropwise. This was followed by heating and stirring for 3 hours. The solvent and unreacted reactants were distilled off under reduced pressure, obtaining 7.7 g of compound 6 having the formula (I).

[Chem. 62]

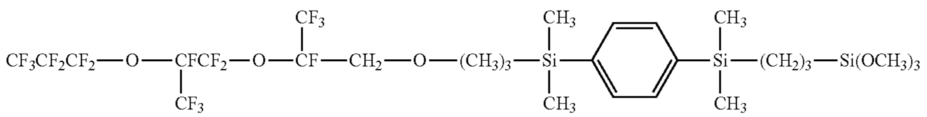

(I)

$^1$H-NMR

δ 0.1 ($-Si-C\underline{H_3}$) 12H

δ 0.7 ($-(CH_2)_2C\underline{H_2}-Si-$) 2H

δ 0.8 ($-Si-C\underline{H_2}(CH_2)_2-Si(OCH_3)_3$, $-Si-(CH_2)_2C\underline{H_2}-Si(OCH_3)_3$) 4H δ 1.6 ($-O-CH_2C\underline{H_2}CH_2-Si-$, $-Si-CH_2C\underline{H_2}CH_2-Si(OCH_3)_3$) 4H δ 3.5 ($-Si(CH_2)_3-Si(OC\underline{H_3})_3$, $-O-C\underline{H_2}-$) 11H δ 3.9 ($-OC\underline{H_2}CF_2$) 2H δ 7.5 ($-Si-C_6\underline{H_4}-Si-$) 4H

Synthesis Example 6

A reactor was charged with 77.5 g ($5.77\times10^{-1}$ mol) of bis(dimethylsilyl) ether, which was heated at 80° C. Then $3.0\times10^{-2}$ g of toluene solution of chloroplatinic acid/vinylsiloxane complex (containing $0.9\times10^{-6}$ mol of Pt) was added, after which 30.0 g ($1.15\times10^{-1}$ mol) of $CF_3(CF_2)_3CH_2CH{=}CH_2$ was added dropwise over 3 hours. This was followed by heating and stirring for 1 hour. The solvent and unreacted reactants were distilled off under reduced pressure, obtaining 40.1 g of a compound having the formula (J).

[Chem. 63]

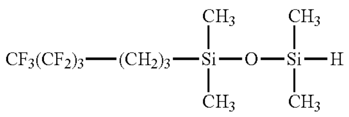

(J)

$^1$H-NMR

δ 0.1-0.2 ($-Si-C\underline{H_3}$) 12H

δ 0.7 ($-(CH_2)2C\underline{H_2}-Si-$) 2H

δ 1.6 ($CF_2-CH_2C\underline{H_2}CH_2-Si-$) 2H

δ 2.1 ($CF_2-C\underline{H_2}(CH_2)_2-Si-$) 2H

δ 4.7 ($-Si-\underline{H}$) 1H

A reactor was charged with 30.0 g ($7.61\times10^{-2}$ mol) of the compound having formula (J).

[Chem. 64]

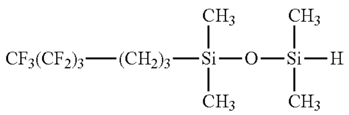

(J)

It was heated at 80° C. Then $3.0\times10^{-2}$ g of toluene solution of chloroplatinic acid/vinylsiloxane complex (containing $0.9\times10^{-6}$ mol of Pt) was added, after which 15.8 g ($1.06\times10^{-1}$ mol) of vinyltrimethoxysilane was added dropwise. This was followed by heating and stirring for 3 hours. The solvent and unreacted reactants were distilled off under reduced pressure, obtaining 35.5 g of compound 7 having the formula (K).

[Chem. 65]

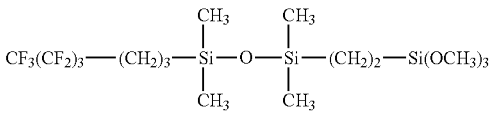

(K)

$^1$H-NMR

δ 0-0.1 ($-Si-C\underline{H_3}$) 12H

δ 0.7 ($-(CH_2)_2C\underline{H_2}-Si-$, $-Si-C\underline{H_2}-CH_2-Si(OCH_3)_3$, $-Si-CH_2-C\underline{H_2}-Si(OCH_3)_3$) 6H δ 1.6 ($CF_2-C\underline{H_2}CH_2CH_2-Si-$) 2H δ 2.1 ($CF_2-C\underline{H_2}(CH_2)_2-Si-$) 2H δ 3.5 ($-Si(CH_2)2-Si(OC\underline{H_3})_3$) 9H

Synthesis Example 7

A reactor was charged with 186.9 g ($9.61\times10^{-1}$ mol) of 1,4-bis(dimethylsilyl)benzene, which was heated at 70° C. Then $5.0\times10^{-2}$ g of toluene solution of chloroplatinic acid/vinylsiloxane complex (containing $1.5\times10^{-6}$ mol of Pt) was added, after which 50.0 g ($1.92\times10^{-1}$ mol) of $CF_3(CF_2)_3CH_2CH{=}CH_2$ was added dropwise over 3 hours. This was followed by heating and stirring for 1 hour. The solvent and unreacted reactants were distilled off under reduced pressure, obtaining 76.1 g of a compound having the formula (L).

[Chem. 66]

(L)

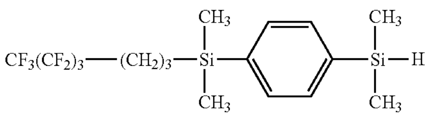

$^1$H-NMR

δ 0.2-0.4 ($-Si-C\underline{H_3}$) 12H

δ 0.7 ($-(CH_2)_2C\underline{H_2}-Si-$) 2H

δ 1.6 ($CF_2-CH_2C\underline{H_2}CH_2-Si-$) 2H

δ 2.1 ($CF_2-C\underline{H_2}(CH_2)_2-Si-$) 2H

δ 4.4 ($-Si-\underline{H}$) 1H

A reactor was charged with 10.0 g ($2.20\times10^{-2}$ mol) of the compound having formula (L).

[Chem. 67]

(L)

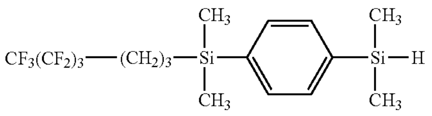

It was heated at 80° C. Then $1.0\times10^{-2}$ g of toluene solution of chloroplatinic acid/vinylsiloxane complex (containing $0.3\times10^{-6}$ mol of Pt) was added, after which 5.0 g ($3.09\times10^{-2}$ mol) of allyltrimethoxysilane was added dropwise. This was followed by heating and stirring for 3 hours. The solvent and unreacted reactants were distilled off under reduced pressure, obtaining 11.8 g of compound 8 having the formula (M).

[Chem. 68]

(M)

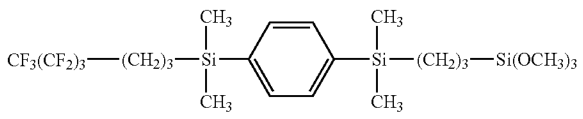

$^1$H-NMR

δ 0.2-0.3 (—Si—C$\underline{H_3}$) 12H

δ 0.7 (—$(CH_2)_2$C$\underline{H_2}$—Si—) 2H

δ 0.8 (—Si—C$\underline{H_2}$$(CH_2)_2$—$Si(OCH_3)_3$, —Si—$(CH_2)_2$C$\underline{H_2}$—$Si(OCH_3)_3$) 4H δ 1.4 ($CF_2$—$CH_2$C$\underline{H_2}$$CH_2$—Si—) 2H δ 1.6 (—Si—$CH_2$C$\underline{H_2}$$CH_2$—$Si(OCH_3)_3$) 2H δ 2.1 ($CF_2$—C$\underline{H_2}$$(CH_2)_2$—Si—) 2H δ 3.5 (—$Si(CH_2)_3$—Si(OC$\underline{H_3}$$)_3$) 9H δ 7.5 (—Si—$C_6$$\underline{H_4}$—Si—) 4H Synthesis Example 8

A reactor was charged with 56.0 g ($4.17\times10^{-1}$ mol) of bis(dimethylsilyl) ether, which was heated at 60° C. Then $3.0\times10^{-2}$ g of toluene solution of chloroplatinic acid/vinylsiloxane complex (containing $0.9\times10^{-6}$ mol of Pt) was added, after which 30.0 g ($8.33\times10^{-2}$ mol) of $CF_3(CF_2)_5CH_2CH{=}CH_2$ was added dropwise over 3 hours. This was followed by heating and stirring for 1 hour. The solvent and unreacted reactants were distilled off under reduced pressure, obtaining 38.3 g of a compound having the formula (N).

[Chem. 69]

(N)

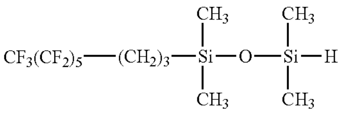

$^1$H-NMR

δ 0.1-0.2 (—Si—C$\underline{H_3}$) 12H

δ 0.7 (—$(CH_2)_2$C$\underline{H_2}$—Si—) 2H

δ 1.6 ($CF_2$—$CH_2$C$\underline{H_2}$$CH_2$—Si—) 2H

δ 2.1 ($CF_2$—C$\underline{H_2}$$(CH_2)_2$—Si—) 2H

δ 4.7 (—Si—H) 1H

A reactor was charged with 30.0 g ($6.07\times10^{-2}$ mol) of the compound having formula (N).

[Chem. 70]

(N)

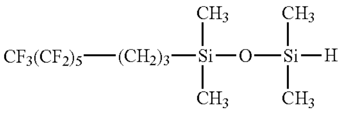

It was heated at 80° C. Then $3.0\times10^{-2}$ g of toluene solution of chloroplatinic acid/vinylsiloxane complex (containing $0.9\times10^{-6}$ mol of Pt) was added, after which 12.6 g ($8.49\times10^{-2}$ mol) of vinyltrimethoxysilane was added dropwise. This was followed by heating and stirring for 3 hours. The solvent and unreacted reactants were distilled off under reduced pressure, obtaining 32.7 g of compound 9 having the formula (O).

[Chem. 71]

-continued (O)

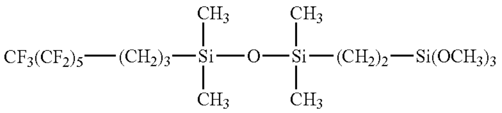

$^1$H-NMR

δ 0-0.1 (—Si—C$\underline{H_3}$) 12H

δ 0.7 (—$(CH_2)_2$C$\underline{H_2}$—Si—, —Si—C$\underline{H_2}$—$CH_2$—$Si(OCH_3)_3$, —Si—$CH_2$—C$\underline{H_2}$—$Si(OCH_3)_3$) 6H δ 1.6 ($CF_2$—$CH_2$C$\underline{H_2}$$CH_2$—Si—) 2H δ 2.1 ($CF_2$—C$\underline{H_2}$$(CH_2)_2$—Si—) 2H δ 3.5 (—$Si(CH_2)_2$—Si(OC$\underline{H_3}$$)_3$) 9H Synthesis Example 9

A reactor was charged with 81.0 g ($4.17\times10^{-1}$ mol) of 1,4-bis(dimethylsilyl)benzene, which was heated at 80° C. Then $3.0\times10^{-2}$ g of toluene solution of chloroplatinic acid/vinylsiloxane complex (containing $0.9\times10^{-6}$ mol of Pt) was added, after which 30.0 g ($8.33\times10^{-2}$ mol) of $CF_3(CF_2)_5CH_2CH{=}CH_2$ was added dropwise over 3 hours. This was followed by heating and stirring for 1 hour. The solvent and unreacted reactants were distilled off under reduced pressure, obtaining 36.1 g of a compound having the formula (P).

[Chem. 72]

(P)

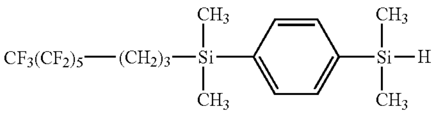

$^1$H-NMR

δ 0.2-0.4 (—Si—C$\underline{H_3}$) 12H

δ 0.7 (—$(CH_2)_2$C$\underline{H_2}$—Si—) 2H

δ 1.6 ($CF_2$—$CH_2$C$\underline{H_2}$$CH_2$—Si—) 2H

δ 2.1 ($CF_2$—C$\underline{H_2}$$(CH_2)_2$—Si—) 2H

δ 4.4 (—Si—H) 1H

A reactor was charged with 30.0 g ($5.42\times10^{-2}$ mol) of the compound having formula (P).

[Chem. 73]

(P)

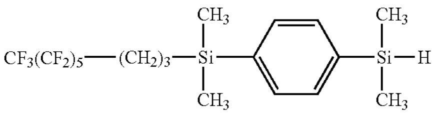

It was heated at 80° C. Then $3.0\times10^{-2}$ g of toluene solution of chloroplatinic acid/vinylsiloxane complex (containing $0.9\times10^{-6}$ mol of Pt) was added, after which 12.0 g ($7.41\times10^{-2}$ mol) of allyltrimethoxysilane was added dropwise. This was followed by heating and stirring for 3 hours. The solvent and unreacted reactants were distilled off under reduced pressure, obtaining 33.7 g of compound 10 having the formula (Q).

[Chem. 74]

(Q)

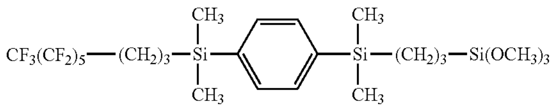

$^1$H-NMR

δ 0.2-0.3 ($—Si—CH_3$) 12H

δ 0.7 ($—(CH_2)_2CH_2—Si—$) 2H

δ 0.8 ($—Si—CH_2(CH_2)_2—Si(OCH_3)_3$, $—Si—(CH_2)_2CH_2—Si(OCH_3)_3$) 4H

δ 1.4 ($CF_2—CH_2CH_2CH_2—Si—$) 2H

δ 1.6 ($—Si—CH_2CH_2CH_2—Si(OCH_3)_3$) 2H

δ 2.1 ($CF_2—CH_2(CH_2)_2—Si—$) 2H

δ 3.5 ($—Si(CH_2)_3—Si(OCH_3)_3$) 9H

δ 7.5 ($—Si—C_6H_4—Si—$) 4H

Examples 1 to 11

A surface treating agent was prepared by mixing compound 1 as the lipophilic group-containing silane or component (A), KBM-7603 ($CF_3—(CF_2)_5—C_2H_4—Si(OCH_3)_3$, Shin-Etsu Chemical Co., Ltd.) as the fluorocarbon group-containing silane or siloxane or component (B), and compound 5 having the formula (R):

[Chem. 75]

(R)

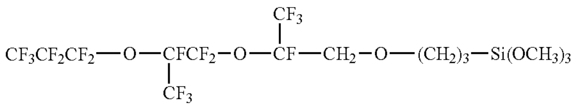

or compounds 6 to 10 in Synthesis Examples, in the ratio shown in Tables 1 and 2, dissolving them in propylene glycol monomethyl ether (PGME) to form a 0.1 wt % solution, and adding acetic acid in a concentration of 0.1 wt %. The surface treating agent was spray coated onto Gorilla glass (Corning Inc.) and cured at 80° C. for 12 hours to form a cured film of ~2 nm thick.

Examples 12 to 14

A surface treating agent was prepared by mixing compounds 2 to 4 as the lipophilic group-containing silane or component (A) and compound 5 as the fluorocarbon group-containing silane or siloxane or component (B) in the ratio shown in Table 2, dissolving them in PGME to form a 0.1 wt % solution, and adding acetic acid in a concentration of 0.1 wt %. The surface treating agent was spray coated onto Gorilla glass (Corning Inc.) and cured at 80° C. for 12 hours to form a cured film of ~2 nm thick.

Comparative Example 1

A surface treating agent was prepared by dissolving compound 5 in PGME to form a 0.1 wt % solution, and adding acetic acid in a concentration of 0.1 wt %. The surface treating agent was spray coated onto Gorilla glass (Corning Inc.) and cured at 80° C. for 12 hours to form a cured film of ~2 nm thick.

Comparative Example 2

A surface treating agent was prepared by mixing compound 1 as the lipophilic group-containing silane or component (A), compound 5 as the fluorocarbon group-containing silane or component (B) in the ratio shown in Table 2, dissolving them in PGME to form a 0.1 wt % solution, and adding acetic acid in a concentration of 0.1 wt %. The surface treating agent was spray coated onto Gorilla glass (Corning Inc.) and cured at 80° C. for 12 hours to form a cured film of ~2 nm thick.

[Evaluation of Fingerprint Visibility]

Sebum was deposited on the glass sample with the cured film, prepared above, under a load of 1 kg. Visibility was evaluated in 4 grades by a sensory test of visual observation. The results are shown in Tables 1 and 2.

4: fingerprints little visible

3: fingerprints fairly visible

2: fingerprints thinly, but definitely visible

1: fingerprints definitely visible

[Evaluation of Haze]

Sebum was deposited on the glass sample with the cured film, prepared above, under a load of 1 kg. Haze was measured by a haze meter NDH 5000 (Nippon Denshoku Industries Co., Ltd.). The results are shown in Tables 1 and 2.

[Evaluation of Wettability]

The glass sample with the cured film, prepared above, was tested using a contact angle meter Drop Master (Kyowa Interface Science Co., Ltd.). The cured film was measured for a contact angle with water or oleic acid (droplet 2 μL, temperature 25° C., humidity 40% RH, measuring time 40 seconds). The results (contact angle with water or oleic acid) are shown in Tables 1 and 2.

TABLE 1

| Amount | Example | | | | | | | |
|---|---|---|---|---|---|---|---|---|
| (wt %) | 1 | 2 | 3 | 4 | 5 | 6 | 7 | 8 |
| Compound 1 | 90 | 90 | 90 | 90 | 90 | 90 | 90 | 50 |
| Compound 2 | | | | | | | | |
| Compound 3 | | | | | | | | |
| Compound 4 | | | | | | | | |
| KBM-7603 | 10 | | | | | | | |
| Compound 5 | | 10 | | | | | | 50 |
| Compound 6 | | | 10 | | | | | |
| Compound 7 | | | | 10 | | | | |
| Compound 8 | | | | | 10 | | | |

TABLE 1-continued

| Amount | Example | | | | | | | |
|---|---|---|---|---|---|---|---|---|
| (wt %) | 1 | 2 | 3 | 4 | 5 | 6 | 7 | 8 |
| Compound 9 | | | | | | 10 | | |
| Compound 10 | | | | | | | 10 | |
| Evaluation | | | | | | | | |
| Fingerprint visibility | 4 | 4 | 4 | 4 | 4 | 4 | 4 | 4 |
| Fingerprint haze (%) | 6.9 | 1.7 | 5.3 | 3.4 | 2.7 | 3.6 | 4.6 | 1.7 |
| Contact angle with water (°) | 82 | 81 | 81 | 82 | 83 | 82 | 83 | 83 |
| Contact angle with oleic acid (°) | 8 | 7 | 13 | 7 | 10 | 7 | 12 | 8 |

TABLE 2

| | Example | | | | | | Comparative Example | |
|---|---|---|---|---|---|---|---|---|
| Amount (wt %) | 9 | 10 | 11 | 12 | 13 | 14 | 1 | 2 |
| Compound 1 | 70 | 70 | 70 | | | | | 10 |
| Compound 2 | | | | 90 | | | | |
| Compound 3 | | | | | 90 | | | |
| Compound 4 | | | | | | 90 | | |
| KBM-7603 | | | | | | | | |
| Compound 5 | | | | 10 | 10 | 10 | 100 | 90 |
| Compound 6 | | | | | | | | |
| Compound 7 | 30 | | | | | | | |
| Compound 8 | | 30 | | | | | | |
| Compound 9 | | | 30 | | | | | |
| Compound 10 | | | | | | | | |
| Evaluation | | | | | | | | |
| Fingerprint visibility | 4 | 4 | 4 | 4 | 4 | 4 | 1 | 2 |
| Fingerprint haze (%) | 3.1 | 4.7 | 4.3 | 1.9 | 2.5 | 3.1 | 15.3 | 17.4 |
| Contact angle with water (°) | 82 | 86 | 83 | 78 | 80 | 84 | 92 | 88 |
| Contact angle with oleic acid (°) | 7 | 21 | 11 | 7 | 8 | 9 | 48 | 27 |

In the evaluation of fingerprint visibility, it was demonstrated in Examples that fingerprints were not visible. In Comparative Example 1 containing only the fluorocarbon group-containing silane, but free of a lipophilic group, fingerprints were definitely visible. In Comparative Example 2 in which the fluorocarbon group-containing silane is extremely more than the lipophilic group-containing silane, fingerprints were visible.

In the haze measurement by haze meter, all Examples showed low haze values, which are compatible with the results of the sensory test.

In the evaluation of wettability, Examples showed satisfactory lipophilicity.

The invention claimed is:

1. A coating composition comprising (A) one or more compounds selected from among compounds having general formula (1) and partial condensates or partial hydrolytic condensates thereof and (B) one or more compounds selected from among compounds having general formula (2) and partial condensates or partial hydrolytic condensates thereof in a weight ratio of from 50:50 to 90:10, total of components (A) and (B) being 100,

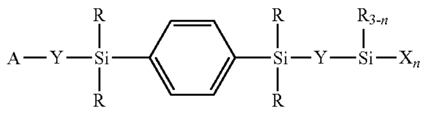
(1)

wherein A is —C(═O)OR[1], —C(═O)NR[1]$_2$, or —C(═O)SR[1], R[1] is hydrogen, a $C_1$-$C_{30}$ alkyl group, $C_6$-$C_{30}$ aryl group or $C_7$-$C_{30}$ aralkyl group, Y is independently a divalent organic group which may contain an organopolysiloxane residue, R is independently a $C_1$-$C_4$ alkyl group or phenyl group, X is independently a hydroxyl group or hydrolyzable group, and n is an integer of 1 to 3,

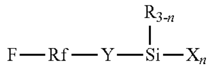
(2)

wherein Rf is a perfluoroalkylene group or divalent perfluoropolyether group, Y is independently a divalent organic group which may contain an organopolysiloxane residue, R is independently a $C_1$-$C_4$ alkyl group or phenyl group, X is independently a hydroxyl group or hydrolyzable group, and n is an integer of 1 to 3.

2. The coating composition of claim 1 wherein in formulae (1) and (2), the divalent organic group of Y is independently a $C_2$-$C_{30}$ alkylene group optionally comprising a divalent group selected from among —O—, —S—, —NR—, —C(═O)—, —C(═O)O—, —C(═O)NR—, —OC(═O)NR—, a $C_6$-$C_{20}$ arylene group, silalkylene group, silarylene group, and straight, branched or cyclic divalent organopolysiloxane residues of 2 to 10 silicon atoms, wherein R is $C_1$-$C_4$ alkyl or phenyl.

3. The coating composition of claim 1 wherein in formulae (1) and (2), the hydroxyl group or hydrolyzable group of X is independently selected from the group consisting of hydroxyl, $C_1$—$C_{10}$ alkoxy, $C_2$-$C_{10}$ alkoxy-substituted alkoxy, $C_2$-$C_{10}$ acyloxy, $C_2$-$C_{10}$ alkenyloxy, halogen, oxime, isocyanate, and cyanate.

4. The coating composition of claim 1 wherein in formula (2), Rf is a $C_3$-$C_{12}$ perfluoroalkylene group or a divalent perfluoropolyether group having a formula (3):

$$-(J-O)_b-J- \quad (3)$$

wherein J is at least one group selected from perfluoroalkylene groups having a structural formulae (a) to (e):

$—CF_2—$ (a)

$—CF_2CF_2—$ (b)

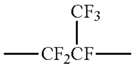 (c)

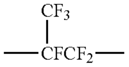 (d)

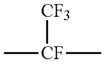 (e)

and all J groups may have the same structure or plural structures that may be arrayed randomly or blockwise, and b indicative of a number of repeating units is from 3 to 6.

5. The coating composition of claim 1, wherein in formula (1), n is 2 or 3.

6. The coating composition of claim 1, wherein in formula (1), n is 3.

7. The coating composition of claim 1, wherein in formula (1), Y is a divalent group having an formula (4):

$$—R^3—Z—(R^3)_a— \quad (4)$$

wherein $R^3$ is independently a $C_1$-$C_{30}$ alkylene group, or a $C_7$-$C_{30}$ alkylene-arylene group containing a $C_6$-$C_{20}$ arylene group, Z is a single bond, or a divalent group selected from the groups consisting of —O—, —S—, —NR—, —C(═O)—, —C(═O)O—, —C(═O)NR—, —OC(═O)NR—, silalkylene group, silarylene group, and straight, branched or cyclic divalent organopolysiloxane residues of 2 to 10 silicon atoms, wherein R is independently a $C_1$-$C_4$ alkyl group or phenyl group, and "a" is 0 or 1.

8. The coating composition of claim 1, wherein in formula (1), Y is any one of the following groups:

$—CH_2CH_2—$ $—CH_2CH_2CH_2—$ $—CH_2CH_2CH_2CH_2—$ $—CH_2CH_2CH_2CH_2CH_2—$ $—CH_2CH_2CH_2CH_2CH_2CH_2—$ $—CH_2CH_2CH_2CH_2CH_2CH_2CH_2CH_2—$ $—CH_2CH_2CH_2CH_2CH_2CH_2CH_2CH_2CH_2—$ $—CH_2CH_2CH_2CH_2CH_2CH_2CH_2CH_2CH_2CH_2—$ $—CH_2CH_2CH_2CH_2CH_2CH_2CH_2CH_2CH_2CH_2CH_2—$ $—CH_2CH_2CH_2CH_2CH_2CH_2CH_2CH_2CH_2CH_2CH_2CH_2CH_2CH_2—$

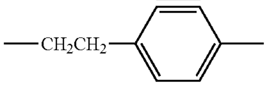

$—CH_2CH_2—O—CH_2CH_2—$

-continued $—(CH_2)_{10}—O—CH_2CH_2—$

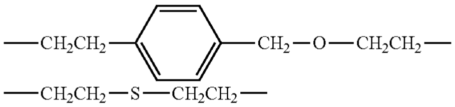

$—CH_2CH_2—S—CH_2CH_2—$

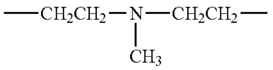

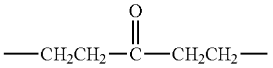

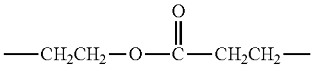

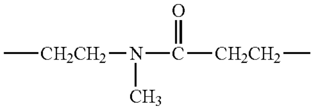

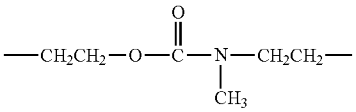

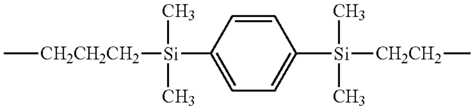

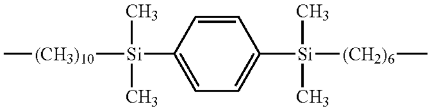

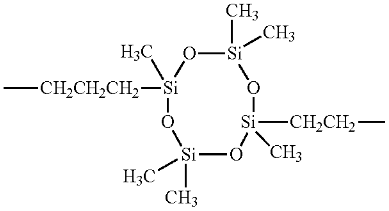

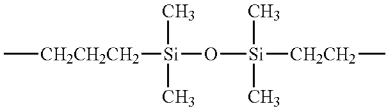

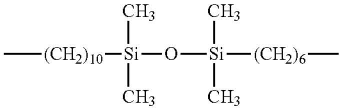.

9. The coating composition of claim 1, wherein in formulae (1) and (2), Y is a $C_2$-$C_{20}$ alkylene group.

10. A surface treating agent comprising the coating composition of claim 1.

11. The surface treating agent of claim 10, further comprising a solvent.

12. The surface treating agent of claim 10, further comprising a hydrolytic condensation catalyst.

13. The surface treating agent of claim 10, which cures into a film having a contact angle with oleic acid of up to 30° at 25° C. at relative humidity 40%.

14. The surface treating agent of claim 10, which cures into a film having a haze of up to 10 when sebum is deposited to the cured film under a load of 1 kg.

15. An article having on its surface a cured film of the surface treating agent of claim 10.

16. A coating composition comprising (A) one or more compounds selected from among compounds having a general formula (1) and partial condensates or partial hydrolytic condensates thereof and (B) one or more compounds selected from among compounds having a general formula (2) and partial condensates or partial hydrolytic condensates thereof in a weight ratio of from 50:50 to 90:10, a total of components (A) and (B) being 100,

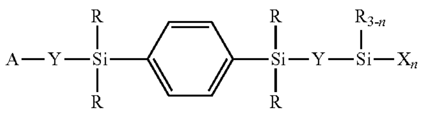

(1)

wherein A is —C(=O)OR$^1$, —C(=O)NR$^1{}_2$, —C(=O)SR$^1$ or —P(=O)(OR$^1$)$_2$, R$^1$ is hydrogen, a $C_1$-$C_{30}$ alkyl group, $C_6$-$C_{30}$ aryl group or $C_7$-$C_{30}$ aralkyl group, Y is independently a divalent organic group which may contain an organopolysiloxane residue, R is independently a $C_1$-$C_4$ alkyl group or phenyl group, X is independently a hydroxyl group or hydrolyzable group, and n is 2 or 3,

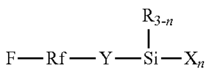

(2)

wherein Rf is a perfluoroalkylene group or divalent perfluoropolyether group, Y is independently a divalent organic group which may contain an organopolysiloxane residue, R is independently a $C_1$-$C_4$ alkyl group or phenyl group, X is independently a hydroxyl group or hydrolyzable group, and n is an integer of 1 to 3.

17. The coating composition of claim 16 wherein in formulae (1) and (2), the divalent organic group of Y is independently a $C_2$-$C_{30}$ alkylene group optionally comprising a divalent group selected from among —O—, —S—, —NR—, —C(=O)—, —C(=O)O—, —C(=O)NR—, —OC(=O)NR—, a $C_6$-$C_{20}$ arylene group, silalkylene group, silarylene group, and straight, branched or cyclic divalent organopolysiloxane residues of 2 to 10 silicon atoms, wherein R is $C_1$-$C_4$ alkyl or phenyl.

18. The coating composition of claim 16 wherein in formulae (1) and (2), the hydroxyl group or hydrolyzable group of X is independently selected from the group consisting of hydroxyl, $C_1$-$C_{10}$ alkoxy, $C_2$-$C_{10}$ alkoxy-substituted alkoxy, $C_1$-$C_{10}$ acyloxy, $C_2$-$C_{10}$ alkenyloxy, halogen, oxime, isocyanate, and cyanate.

19. The coating composition of claim 16 wherein in formula (2), Rf is a $C_3$-$C_{12}$ perfluoroalkylene group or a divalent perfluoropolyether group having a formula (3):

$$-(J-O)_b-J- \quad (3)$$

wherein J is at least one group selected from perfluoroalkylene groups having a structural formulae (a) to (e):

$$-CF_2- \quad (a)$$

$$-CF_2CF_2- \quad (b)$$

-continued (c)

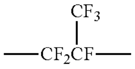

(d)

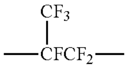

(e)

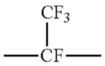

and all J groups may have the same structure or plural structures that may be arrayed randomly or blockwise, and b indicative of a number of repeating units is from 3 to 6.

20. The coating composition of claim 16, wherein in formula (1), Y is a divalent group having an formula (4):

$$-R^3-Z-(R^3)_a- \quad (4)$$

wherein R$^3$ is independently a $C_1$-$C_{30}$ alkylene group, or a $C_7$-$C_{30}$ alkylene-arylene group containing a $C_6$-$C_{20}$ arylene group, Z is a single bond, or a divalent group selected from the groups consisting of —O—, —S—, —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein R is independently a $C_1$-$C_4$ alkyl group or phenyl group, and "a" is 0 or 1.

21. The coating composition of claim 16, wherein in formula (1), Y is any one of the following groups:

$-CH_2CH_2-$ $-CH_2CH_2CH_2-$ $-CH_2CH_2CH_2CH_2-$ $-CH_2CH_2CH_2CH_2CH_2-$ $-CH_2CH_2CH_2CH_2CH_2CH_2-$ $-CH_2CH_2CH_2CH_2CH_2CH_2CH_2CH_2-$ $-CH_2CH_2CH_2CH_2CH_2CH_2CH_2CH_2CH_2-$ $-CH_2CH_2CH_2CH_2CH_2CH_2CH_2CH_2CH_2CH_2-$ $-CH_2CH_2CH_2CH_2CH_2CH_2CH_2CH_2CH_2CH_2CH_2-$ $-CH_2CH_2CH_2CH_2CH_2CH_2CH_2CH_2CH_2CH_2CH_2CH_2CH_2CH_2-$

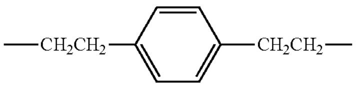

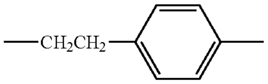

$-CH_2CH_2-O-CH_2CH_2-$ $-(CH_2)_{10}-O-CH_2CH_2-$

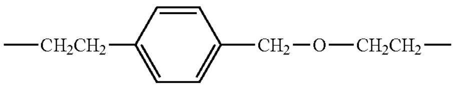

$-CH_2CH_2-S-CH_2CH_2-$

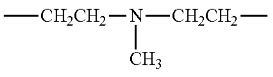

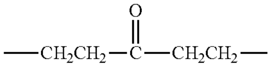

-continued

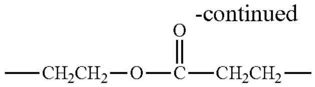

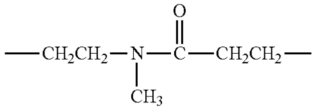

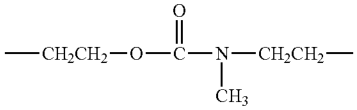

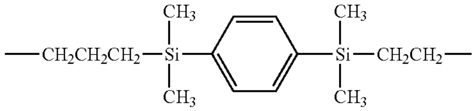

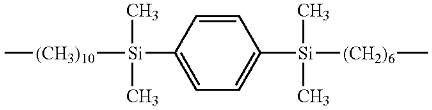

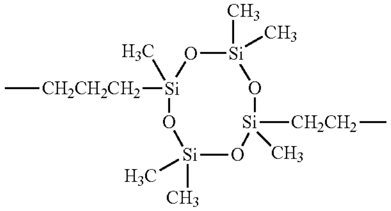

-continued

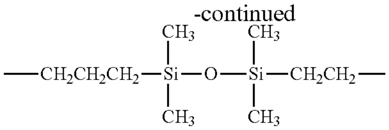

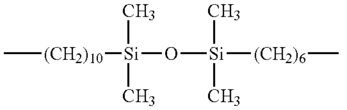

.

22. The coating composition of claim 16, wherein in formulae (1) and (2), Y is a $C_2$-$C_{20}$ alkylene group.

23. A surface treating agent comprising the coating composition of claim 16.

24. The surface treating agent of claim 23, further comprising a solvent.

25. The surface treating agent of claim 23, further comprising a hydrolytic condensation catalyst.

26. The surface treating agent of claim 23, which cures into a film having a contact angle with oleic acid of up to 30° at 25° C. at relative humidity 40%.

27. The surface treating agent of claim 23, which cures into a film having a haze of up to 10 when sebum is deposited to the cured film under a load of 1 kg.

28. An article having on its surface a cured film of the surface treating agent of claim claim 23.

* * * * *